US010516266B2

(12) United States Patent
De Ridder et al.

(10) Patent No.: US 10,516,266 B2
(45) Date of Patent: Dec. 24, 2019

(54) POWER SUPPLY NETWORK CONTROL SYSTEM AND METHOD

(71) Applicant: VITO NV, Mol (BE)

(72) Inventors: Fedor De Ridder, Ukkel (BE); Bert Claessens, Spalbeek (BE); Sven De Breucker, Herent (BE)

(73) Assignee: VITO NV, Mol (BE)

( * ) Notice: Subject to any disclaimer, the term of this patent is extended or adjusted under 35 U.S.C. 154(b) by 583 days.

(21) Appl. No.: 14/892,509

(22) PCT Filed: May 22, 2014

(86) PCT No.: PCT/BE2014/000022
§ 371 (c)(1),
(2) Date: Nov. 19, 2015

(87) PCT Pub. No.: WO2014/186845
PCT Pub. Date: Nov. 27, 2014

(65) Prior Publication Data
US 2016/0105023 A1   Apr. 14, 2016

(30) Foreign Application Priority Data
May 22, 2013   (EP) .................................... 13168701

(51) Int. Cl.
*H02J 3/14* (2006.01)
*G05B 15/02* (2006.01)
(Continued)

(52) U.S. Cl.
CPC ................ *H02J 3/14* (2013.01); *G05B 15/02* (2013.01); *H02J 3/008* (2013.01); *H02J 3/24* (2013.01);
(Continued)

(58) Field of Classification Search
CPC ..... H02J 3/008; H02J 3/14; H02J 3/24; G05B 15/02; Y04S 20/222; Y04S 50/10; Y02B 70/3225
See application file for complete search history.

(56) References Cited

U.S. PATENT DOCUMENTS

2002/0188894 A1* 12/2002 Goodman ............. G06F 3/0614
714/43
2007/0288674 A1* 12/2007 Ikeno ................... G05B 19/058
710/110
(Continued)

FOREIGN PATENT DOCUMENTS

EP          2081273 A2    7/2009
WO    2012/129675 A1    10/2012

OTHER PUBLICATIONS

Mexican Office Action dated May 22,2017, MX/a/2015/015967, for and English translation thereof.
(Continued)

*Primary Examiner* — M. N. Von Buhr
(74) *Attorney, Agent, or Firm* — Bacon & Thomas, PLLC

(57) ABSTRACT

A method or system for controlling an energy or power supply network having a coordination centre, a plurality of local end-user units and a communications network linking the local units and the coordination centre and a supply network connecting the local units and the coordination centre for energy or power supply. The supply network has constraints that limits power or energy consumption at at least one of the local end-user units. The method or system is adapted so that the coordination centre transmits a control signal indicating a degree of imbalance of the system to the at least one of the local end-user units, and the at least one local end-user unit is adapted to transmit a reaction signal to the coordination centre indicative of a power schedule for the local unit.

20 Claims, 19 Drawing Sheets

(51) Int. Cl.
*H02J 3/00* (2006.01)
*H02J 3/24* (2006.01)
(52) U.S. Cl.
CPC .......... *Y02B 70/3225* (2013.01); *Y04S 20/222* (2013.01); *Y04S 50/10* (2013.01)

(56) References Cited

U.S. PATENT DOCUMENTS

| | | | | |
|---|---|---|---|---|
| 2011/0270454 | A1* | 11/2011 | Kreiss | G06Q 50/06 700/291 |
| 2011/0270457 | A1* | 11/2011 | Kreiss | G06Q 50/06 700/292 |
| 2011/0270550 | A1* | 11/2011 | Kreiss | G06Q 50/06 702/60 |
| 2013/0103223 | A1 | 4/2013 | Liebel | |
| 2013/0173073 | A1* | 7/2013 | Breeze | F03D 7/0284 700/287 |
| 2014/0018971 | A1* | 1/2014 | Ellis | G06Q 10/04 700/297 |

OTHER PUBLICATIONS

International Preliminary Report on Patentability (IPRP) dated Nov. 24, 2015, for PCT/BE2014/000022.
Official Communication in European Patent Application No. 14732498.2-1804, dated Dec. 18, 2017.
International Search Report (ISR) dated Oct. 29, 2014, for PCT/BE2014/000022.
Written Opinion dated Oct. 29, 2014, for PCT/BE2014/000022.
European Search Report dated Nov. 5, 2013, for EP 13168701.4.
F. H. a. W. J. E. Harlow, "Numerical calculation of time-dependent viscous incompressible flow of fluid with free surface," Phys. Fluids., vol. 8, p. 2182, 1965.
"Annex 42: The Simulation of Building-Integrated Fuel Cell and Other Cogeneration Systems (COGEN-SIM)," http://www.ecbcs.org/annexes/annex42.htm, 2003 [Online].
W. V. J. J. S. R. L.-G. A. Mohsenian-Rad A, "Autonomous demand-side management based on game-theoretic energy consumption scheduling for the future smart grid," IEEE Transactions on Smart Grids, vol. 1, nr. 3, pp. 320-331, 2010.
B. V. B. M. H. J. S. G. Molderink A, "Management and control of domestic smart grid technology," IEEE Transactions on Smart Grids, vol. 1, nr. 2, pp. 109-119, 2010.
G. G. Gatsis N, "Residential load control: distributed scheduling and convergence with lost AMI messages," IEEE Transactions on Smart Grids, p. in press, 2012.
C. I. O. J. Ruiz N, "A direct load control model for virtual power plant management," IEEE Transactions on Power Systems, vol. 24, nr. 2, pp. 959-966, 2009.
B. A. P. W. S. W. Anderson A, "Adaptive stochastic control for the smart grid," Proceedings of the IEEE, vol. 99, nr. 6, p. 1098, 2011.
Koen Kok, Martin Scheepers, and René Kamphuis. Intelligence in electricity networks for embedding renewables and distributed generation. Chapter in: R.R. Negenborn, Z. Lukszo, and J. Hellendoorn, editors, Intelligent Infrastructures. Springer, Intelligent Systems, Control and Automation: Science and Engineering Series, 2009.
European Office Action dated Jan. 20, 2017, for EP 14732498.2.
Official Communication in European Patent Application No. 14732498.2-1202, dated Nov. 22, 2018.

* cited by examiner

POWER SUPPLY NETWORK CONTROL SYSTEM AND METHOD

The present invention relates to power or energy supply systems and their control methods and components therefor, which enable different market actors having arbitrary control software to cooperate so that some common constraints can be met.

BACKGROUND

One may expect that power demand will increase over the next years, assuming that e.g. heat pumps and distributed energy sources and sinks will become more popular. Distribution System Operators (DSO) and Transmission System Operators (TSO) have two options to deal with increasing demands: (i) increase the capacity of the network, which is expensive or (ii) make the network more intelligent and make the actors communicate so that congestion and inefficiency can be avoided.

Due to the liberalization of the electricity market it is anticipated that many electrical supply retailers will be active. Some of these retailers will buy power on e.g. a day-ahead market, while others will be producing their own power. At least some of the power could be generated by wind farms or other renewable sources. Since the output of these renewable resources is more difficult to predict, manage and match with demand, an option is to tailor the consumption of end-users to the actual production by e.g. switching on/off heat pumps at the right moment, e.g. by working to priorities. The latter demands a significant coordination between the scattered end-users on the one hand and the production units on the other hand. Such coordination is not immediately necessary for conventional retailers, who buy their power on e.g. a day-ahead market or produce it in a conventional nuclear plant for example.

All these different retailers can have different controllers and communication devices installed. Some companies might not use anything, while other retailers use advanced control and communication devices to match the end-users consumption on the actual power production. Still other retailers may use the flexibility of the end-users to increase their profits on e.g. the imbalance market: if the overall power consumption is actually lower than the overall production, these retailers can make some profit by not consuming power they had bought on a day-ahead market and offering this power on the imbalance market.

Starting from an overall electrical system in which electrical power is supplied to a large number of devices, in principle a controller can be constructed which can operate all these devices, can take into account all constraints and is able to find a global optimum. This will become impractical if the number end-users or devices becomes too large, e.g. because of memory problems and computational speed.

One possible solution is the use of smart grids that introduce intelligence (i.e. programmable digital processing power and memory) centrally (e.g. production) and locally (e.g. consumption) into the power grid. Intelligence means, for example, software and programmed microprocessors to control power consumption and production so that both remain in equilibrium.

One may expect that many different types of intelligence i.e. software, will be introduced on the market. It may very well be possible that every retailer will work with its own and often proprietary product.

Three problems that can arise in this context are:
In a power grid, many actors are present (the end-users, the retailers, the Distribution System Operator (DSO), the Transmission System Operator (TSO), the Balance Responsible Party (BSP) and the power producers . . . . All these actors need to cooperate to meet common constraints. Two examples are:
The network: each line and each transformer has a finite capacity, which has to be taken into account.
Every Joule of energy that is produced somewhere needs to be consumed; otherwise the grid will become unstable.
So somehow the different actors need to communicate in an automated and controlled way.
The software used e.g. by the retailers on a domestic level may differ from retailer to retailer. A first one may be using a PowerMatcher-like algorithm like is nowadays being developed by IBM, while a second retailer may have decided to use no intelligence at all, because this intelligence interferes with standard load profiles, which makes it more difficult to predict future consumption. A third retailer may be using very sophisticated software which makes planning a day in advance in order to increase profits on the imbalance market. If the power traded by all these end-users needs to pass a common feeder, with a limited capacity, this feeder needs to communicate capacity constraints.
Nowadays it is reasonably simple to meet both of the above problems on a TSO level, when only a few (very large) producers are active. In a future with the possibility of many decentralized production units, like Combined Heat and Power (CHP) units, windmills and photovoltaic installations, it will become very difficult/impossible to compute and control the power flows in a centric manner. On a DSO level no intelligence is generally present. With a large and variegated system there is a conflict between using only local intelligence which then requires a considerable amount of inter-user communication to obtain an optimization and an only centric control system which has one controller or only a few controllers but which requires communication between the central controller and all the end users. In either case the loss of communication caused by an outage stalls the optimization and control processes.
In addition, many renewable resources are hard to control. How much wind will there be tomorrow? Will the sun shine at 14 h30'?
A third problem relates to privacy issues. If power is produced locally (by the end-users for example), will the end-user be willing to share local constraints and information?
WO 2012/129675 discloses a system having an energy hub for management and optimization of energy utilization, e.g. consumption, production and storage. The energy hub management system comprises a micro energy hub configured to communicate with two or more energy components at a premises. An energy optimization engine has an energy component model for each energy component based on each energy component's operating characteristics, the energy optimization engine being adapted to receive at least one input from the two or more energy components and an input from an external data source on any external energy utilization restrictions for the micro energy hub. In response to at least one input from the two or more energy components and any external energy utilization restrictions on the micro energy hub, the energy optimization engine is adapted to issue one or more control signals to at least one of the energy components at the premises to optimize energy utilization based on one or more optimization criteria. The one or more macro energy hubs are adapted to temporarily override a schedule for operation of energy components established by the micro energy hubs in order to prevent a brown-out or black-out on the energy grid. A distribution system may include different consumers or producers with widely different priorities. For example, emergency services such as fire stations, hospitals, or civil defense organisations may want to have a much more secure electricity supply. Television and radio broadcasters may have a low priority normally, but this can change to high when the general public needs to be informed, e.g. of an approaching hurricane. A unilateral intervention to override local schedules can affect such services negatively and is only justified in real emergency situations. For all other situations and different approach is required.

SUMMARY OF THE INVENTION

An aspect of the present invention is to provide a coordination mechanism, system and methods and components therefor, which enable different market actors having arbitrary control software to cooperate so that some common constraints can be met. A further advantage of some embodiments is that individual objectives can be balanced.

In one aspect a method or system for controlling an energy or power supply network is provided comprising a coordination centre, a plurality of local end-user units and a power and a communications network linking the local units and the coordination centre and a supply network connecting the local units and the coordination centre for energy or power supply, the supply network having one or more constraints that limit power or energy consumption at at least one of the local end-user units, the method or system being adapted so that the coordination centre transmits a control signal indicating a degree of deviation from a norm or a degree of imbalance of the system to the at least one of the local end-user units, and the at least one local end-user unit is adapted to transmit a reaction signal to the coordination centre indicative of a power schedule for the local unit.

The network can be any energy or power supply network such as an electrical, heat or gas network.

The transmitting a degree of imbalance is an improvement over a unilateral intervention by overriding local schedules. A important advantage of embodiments of the present invention is that they can cope with multiple objectives of which an emergency is only one. For example, end-users may want to benefit from low prices and want to increase their production, DSOs may want to lower reactive power or constrain the consumption in one street, while the retailer may want to increase it at the same time. Embodiments of the present invention can identify a stable solution while allowing a variety of local optimisations.

In accordance with embodiments of the present invention imbalance can be the difference between produced and consumed energy or it can mean a degree of any type of deviation, e.g. between optimal imbalance, reactive power, current, voltage, pressure, temperature or other measures for the state of the network that should remain within predefined bounds."

Embodiments of the present invention can balance multiple constraints. In such a case a steering signal can be associated with each constraint. The end-users can receive the sum of all the steering signals.

For communication purposes between components of the network any suitable remote communication can be used such as a cable or wireless network. The power or energy supply network can be an electrical power supply system via cables or it can be a heat energy supply system. A control signal or a reaction signal may be described as "steering signal".

In embodiments of the present invention, the steering signal may be a Lagrange multiplier. The steering signal in embodiments of the present invention is not overruling a local controller, but is an incentive to adapt behavior. The allows the distributed control system to find its own solution. Suppose, for example a local grid has an small energy shortage. The network can easily continue working if some devices lower their consumption and/or some others increase their production.

What these embodiments do is not to overrule the devices. Instead, the centre can alter the Lagrange multiplier to promote a change in behaviour. Local controllers are free to decrease consumption or to ignore this incentive. If the problem is not solved, the centre can increase the value of the Lagrange multiplier until the desired reaction is reached.
Translation In accordance with embodiments of the present invention translation of control and/or power schedule signals to a desired local control signal is provided. In accordance with embodiments of the present invention translation and/or scheduling agents are provided.

A method or system according to embodiments of the present invention may be provided with a local controller at a local end-user unit and an agent for translating the control signal for inputting to the local controller or an agent for generating the reaction signal.

An agent for use with a system may be provided with a local controller at a local end-user unit and the agent may be adapted for translating a control signal indicating a degree of imbalance of the system and for inputting to the local controller or the agent being adapted for generating the reaction signal indicative of a power schedule for the local end-user unit.
Check/Correct if Cheating/Systematic Errors In accordance with embodiments of the present invention, by comparing the proposed schedule with historical data, errors and cheating can easily be identified. Both should, in a statistical sense, not differ. More precisely, averaged over long time series, the difference between predicted and consumed power should be close to zero. If this is not the case, then there is an error such as local intelligence not being tuned well or there is cheating.

In accordance with embodiments of the present invention a method or system can be provided that is adapted to compare the reaction signal with a reaction signal derived from historical data to determine an error or to determine fraudulent behavior.
Make Predictions if Necessary In accordance with embodiments of the present invention agents can predict future consumption, which can be used to produce standard load profiles. This may have value for the retailers. A retailer typically has an imbalance cost, for example about 15% and better predictions could reduce this cost.

According to embodiments of the present invention a power schedule may include predicting a future consumption.
Voltage Control in Distribution Network In accordance with embodiments of the present invention he control signal can be derived from a voltage signal. The voltage signal may be the voltage of the power network— lowering or raising of the voltage about a standard value being an indication of the degree of off-stable operation of the power supply system.

Keep Functioning if Communication Breakdown

In accordance with embodiments of the present invention following communication failure between a coordination centre and at least one end-user unit, the local end-user unit continues to control local power consumption using the last known control, i.e. steering signal. Optionally the coordination center can be adapted to continue coordinating other end-users, taking only the out-dated schedules from the disconnected unit or units into account.

In addition, local networks can continue functioning if the global communication network fails. If, for example, a neighborhood can still communicate, but the communication with other neighborhoods fails, this local network can still be operated. This can avoid black-outs or facilitate start-ups after a black-out.

Optimal Communication Signal

In accordance with embodiments of the present invention the control or steering signal can be a Lagrange multiplier or the signals generated by e.g. column generation.

Column generation is a method where each end-user sends a set of possible scenarios to the coordination centre and the coordination centre selects that one which is best.

An advantage is that with the steering signals, e.g. Lagrange multipliers and Scheduling signals, an advantageous or optimal solution can be found.

Optimization is the selection of a better than local, or globally best element with regard to some relevant criteria from some a set of available alternatives.

For example, an optimization problem comprises finding an extreme such as maximizing or minimizing a real function. An example method could include systematically or randomly choosing input values from within an allowed set and computing the value of the function. Alternatively analytic functions can be used. The generalization of optimization theory and techniques to other formulations comprises a large area of applied mathematics. More generally, optimization includes finding "best available" values of some objective function given a defined domain, including a variety of different types of objective functions and different types of domains.

Embodiments

Embodiments of the present invention may be formalized as:

Clause 1. Embodiments of the present invention provide a method for controlling an energy or power supply network, comprising a coordination centre, a plurality of local end-user units and a communications network linking the local units and the coordination centre and a supply network connecting the local units and the coordination centre for energy or power supply, the supply network having at least one or more constraints that limits power or energy consumption at at least one of the local end-user units, the method comprising:
the coordination centre transmitting a steering control signal indicating a degree of deviation of the system to the at least one of the local end-user units, and the at least one local end-user unit transmitting a reaction signal to the coordination centre indicative of a power schedule for the local unit.

Clause 2. The method according to clause 1 there being a local controller at a local end-user unit, further comprising translating control and/or reaction signals to be understandable for the local controller.

Clause 3. The method of any previous clause further comprising:
comparing the reaction signal with consumed or produced entities derived from historical data to determine an error or to determine fraudulent behavior or other deviations.

Clause 4. The method according to any previous clause wherein a power schedule includes a prediction of a future consumption.

Clause 5. The method of any previous clause wherein the control signal is derived from a technical constraint setting, selected from voltage, frequency, current, temperature, pressure, chemical composition or other variables describing the state of the network.

Clause 6. The method of clause 5 wherein the voltage signal is a frequency or a voltage of the energy or power supply network, whereby lowering or raising of the voltage or frequency about a standard value being an indication of the degree of off-stable operation of the power supply system.

Clause 7. The method of any previous clause wherein following communication failure between a coordination centre and at least one end-user unit, the local end-user unit continues to control local power consumption using the last known control signal.

Clause 8. The method of clause 7 wherein the coordination center continues coordinating other end-users, taking only the out-dated schedules from the disconnected unit or units into account.

Clause 9. The method of any previous clause wherein control signal is a Lagrange multiplier or the control signals exchanged in column generation.

Clause 10. The method of any previous clause wherein the control signal represents a measure of whether power or energy used is too high or too low.

Clause 11. The method of any previous clause wherein controlling the energy or power supply network, comprises any of:
controlling the reactive power in the network;
controlling the power flows in the network, so that operation of network components remains stable;
keeping the network operating within network constraints, for example keeping the voltage, current or frequency at every point in the network within predefined limits;
controlling harmonics,
balancing power so that produced and consumed power is equal.

Clause 12. The method of any previous clause, wherein the control or the reaction signal has a scalar value.

Clause 13. The method of any previous clause wherein power consumption or production is characterized by any of power, reactive power or harmonics and for each of these quantities a different set of imbalance parameters is used.

Clause 14. The method of any previous clause wherein controlling the energy or power supply network includes the step of decomposing the control into sub-problems which each can be solved locally in local controllers or centrally in a co-ordination centre via an iterative process.

Clause 15. The method of any previous clause wherein the control signal is updated according to the reaction signal.

Clause 16. The method according to any previous clause wherein the control signal can be any of
A penalty function or value as function of consumed power,
A penalty without horizon,
A multiple of control signals selected from voltage, current, phase difference between voltage and current or harmonics.

Clause 17. The method of any previous clause wherein the reaction signal is an aggregate of schedules from different local end users.

Clause 18. The method of any previous clause wherein the reaction signal comprises or consists of two parts, a first part related to the instant power consumption/prediction, and a second, prediction part.

Clause 19. The method of any previous clause wherein controlling the energy or power supply network is such that
a set of network constraints is met
the control signal is steady, and
the reaction signals are steady.

Clause 20. The method of any previous clause wherein the reaction is signal is obtained by monitoring whether the one or more or all constraints are met or violated.

Clause 21. The method of any previous clause wherein the local unit has local intelligence and digital processing power and runs a solver which solves a power use optimization problem of the local unit taking into account the received control signal.

Clause 22. The method of clause 21 wherein depending on the value of the control signal, a power schedules are sent to the coordination centre from the local unit.

Clause 23. The method of clause 22 wherein the coordination centre receives the schedule and updates the control signal and resends the updated control signal to the local unit, and the method of clause 22 and 23 is iterated until the one or more or all constraints are met.

Clause 24. Embodiments of the present invention provide a system for controlling an energy or power supply network comprising a coordination centre, a plurality of local end-user units and a communications network linking the local units and the coordination centre and a supply network connecting the local units and the coordination centre for energy or power supply, the supply network having one or more constraints that limits power or energy consumption at at least one of the local end-user units, the system being adapted so that the coordination centre transmits a control signal indicating a degree of imbalance of the system to the at least one of the local end-user units, and the at least one local end-user unit is adapted to transmit a reaction signal to the coordination centre indicative of a power schedule for the local unit.

Clause 25. The system of clause 24 further comprising translation and/or scheduling agents are provided.

Clause 26. The system of clause 25 further comprising a local controller at a local end-user unit and an agent for translating the control signal for inputting to the local controller or an agent for generating the reaction signal.

Clause 27. The system of any previous clause adapted to compare the reaction signal with a reaction signal derived from historical data to determine an error or to determine fraudulent behavior.

Clause 28. The system of any of the clauses 25 to 27 further comprising agents to predict future consumption, wherein the power schedule may include predicting a future consumption.

Clause 29. The system according to any of the clauses 24 to 28 adapted to derive the control signal from a voltage, current or frequency signal.

Clause 30. The system of any of the clauses 24 to 29; adapted so that following communication failure between a coordination centre and at least one end-user unit, the local end-user unit continues to control local power consumption using the last known control signal.

Clause 31. The system of clause 30 wherein the coordination center is adapted to continue coordinating other end-users, taking only the out-dated schedules from the disconnected unit or units into account.

Clause 32. The system according to any of the clauses 24 to 31 wherein the control signal is a Lagrange multiplier Clause 33. The system of any of the clauses 24 to 32 wherein the control signal represents a measure of whether power or energy used is too high or too low.

Clause 34. The system of any of the clauses 24 to 33 adapted to control the energy or power supply network, by an of:
controlling the reactive power in the network;
controlling the power flows in the network, so that operation of network components remains stable;
keeping the network operating within network constraints, for example keeping the voltage, current or frequency at every point in the network within predefined limits; controlling harmonics, balancing power so that produced and consumed power is equal.

Clause 35. The system of any of the clauses 24 to 34, wherein the control or the reaction signal has a scalar value.

Clause 36. The system method of any of the clauses 24 to 35 wherein power consumption or production is characterized by any of power, reactive power or harmonics and the system is adapted so that for each of these quantities a different set of imbalance parameters is used.

Clause 37. The system of any the clauses 24 to 36, adapted so that controlling the energy or power supply network includes decomposing the control into sub-problems which each can be solved locally in local controllers or centrally in a co-ordination centre via an iterative process.

Clause 38. The system of any of the clauses 24 to 37 adapted so that the control signal is updated according to the reaction signal.

Clause 39. The system according to any of the clauses 24 to 38 wherein the control signal can be any of
A penalty function or value as function of consumed power,
A penalty without horizon,
A multiple of control signals selected from voltage, current, phase difference between voltage and current or harmonics.

Clause 40. The system of any of the clauses 24 to 39 wherein the reaction signal is an aggregate of schedules from different local end users.

Clause 41. The system of any of the clauses wherein the reaction signal comprises or consists of two parts, a first part related to the instant power consumption/prediction, and a second, prediction part.

Clause 42. The system of any of the clauses 24 to 41 adapted to control the energy or power supply network such that
a set of constraints is met
the control signal is steady, and
the reaction signals are steady.

Clause 43. The system of any of the clauses 24 to 42 adapted so that the reaction is signal is obtained by monitoring whether one or more or all of the constraints are met or violated.

Clause 44. The system of any of the clauses 24 to 43 wherein the local unit has local intelligence and digital processing power and is adapted run a solver which solves a power use optimization problem of the local unit taking into account the received control signal.

Clause 45. The system of clause 44 wherein depending on the value of the control signal, a power schedule is sent to the coordination centre from the local unit.

Clause 46. The system of clause 45 wherein the coordination centre is adapted to receive the schedule and to update the control signal and to resends the updated control signal to the local unit.

Clause 47. The system of any of the clauses 26 to 46, the local controller being provided as a separate device having a processing device with a processing engine and memory and interfaces for communicating with the co-ordination centre and a translation or scheduling agent.

Clause 48 Embodiments of the present invention provide a computer program product comprising code segments which when executed on a processing device implement any of the method clauses 1 to 23.

Clause 49. Embodiments of the present invention provide a signal storage device storing the computer program product of clause 48.

Clause 50. Embodiments of the present invention provide a co-ordination centre for use with a system for controlling an energy or power supply network comprising the coordination centre, a plurality of local end-user units and a communications network linking the local units and the coordination centre and a supply network connecting the local units and the coordination centre for energy or power supply, the supply network having one or more constraints that limits power or energy consumption at at least one of the local end-user units, the co-ordination centre being adapted to transmits a control signal indicating a degree of deviation of the system to the at least one of the local end-user units, and to receive from the at least one local end-user unit a reaction signal indicative of a power schedule for the local unit.

Clause 51. Embodiments of the present invention provide a local user unit for use with a system for controlling an energy or power supply network comprising a coordination centre, a plurality of local end-user units and a communications network linking the local units and the coordination centre and a supply network connecting the local units and the coordination centre for energy or power supply, the supply network having one or more constraints that limits power or energy consumption at at least one of the local end-user units, the at least one local user unit being adapted to receive a control signal indicating a degree of imbalance of the system from the co-ordination centre, and the at least one local end-user unit being adapted to transmit a reaction signal to the coordination centre indicative of a power schedule for the local unit.

NOMENCLATURE

Figure 1:
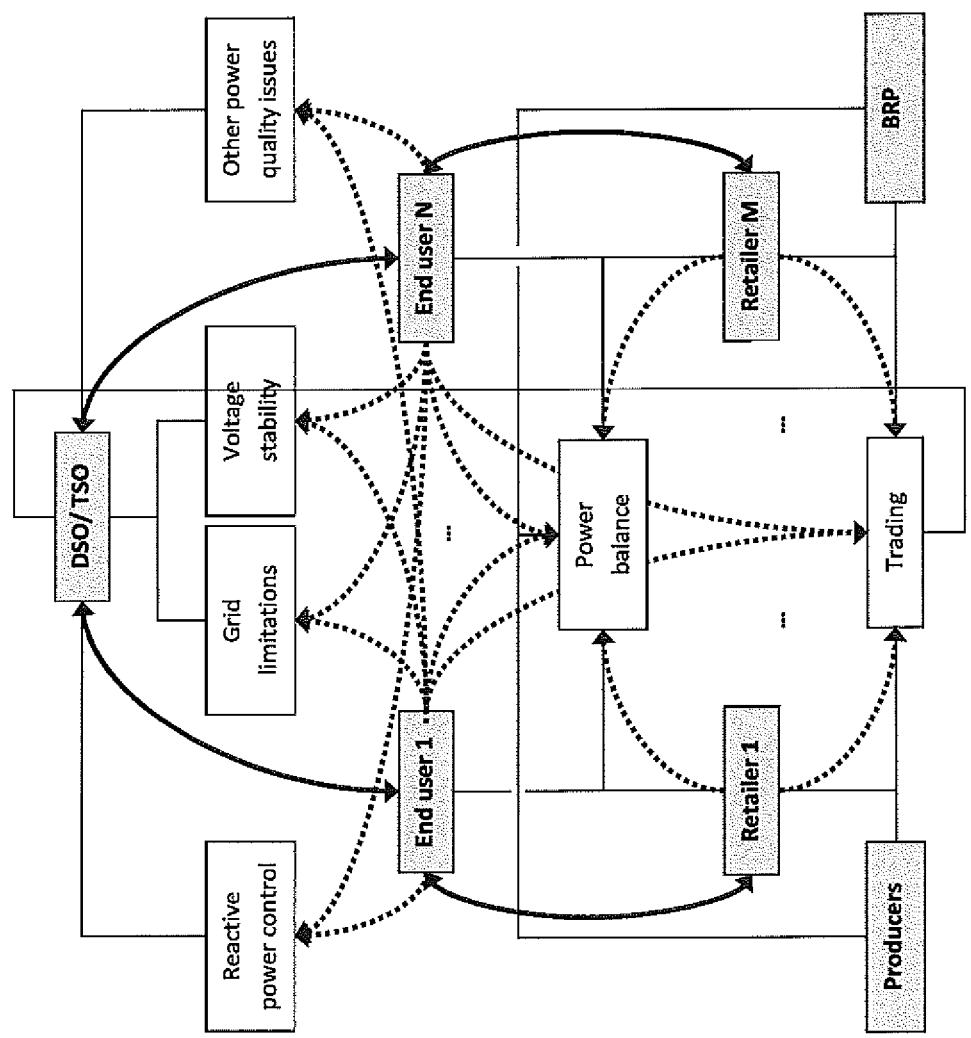
FIG. 1 is an overview of different actors that can be involved and need to be controlled; of the problems to be controlled, of their current relations and of the communication layer, i.e. the communications network, as embodiments of the present invention.

The main notation is stated below for quick reference. This is the symbol list for embodiment 2. In the others the symbols are explained as they appear.

Other symbols are defined as required throughout the text.

$\Delta_t^+$, $\Delta_t^-$ The positive and negative imbalance at time t (kW), $\varepsilon$ Parameter to quantify transport losses (€/kWh$^2$)

$\gamma_t$ Lagrange multiplier at time t $E_{i,t}^1$, $E_{i,t}^2$ Energy stocked in respectively the hot water and heat buffer (kWh)

$f_i(p_{i,t})$ The cost of heat pump i at time t (€/MWh)

$g(\Delta_t^+,\Delta_t^-)$ The imbalance cost at time t (€/MWh)

$h(p_t)$ The cost for the DSO at time t (€/MWh)

$p_{i,t}$ Electrical power consumed by heat pump i at time t $p_{i,t}^1$, $p_{i,t}^2$ Power for respectively the hot water buffer and the heat buffer (kW)

$T_S$ Sample period (15 minutes)

DETAILED DESCRIPTION OF THE INVENTION

The present application relates to methods and systems for control of power supply networks having a combination of different local coordination mechanisms, like the Power-Matcher, the Intelligator, and an ordinary Model Predictive Controller, which are used in a method or a system or as elements of such a system. These embodiments can be useful when different power supply retailers are using different power control software modules. Using embodiments of the present invention these different software modules can communicate in order to coordinate the power supply to keep the system within constraints. In an electrical system these may be selected from power, frequency (for AC systems), voltage or current so that e.g. a feeder is not overloaded. In a heating system this may be temperature or heat flow. In one aspect of the present invention an iterative communication or control signal is used, whereby at least one or some or every local unit in the network has to provide a reaction signal e.g. to supply or declare its present or predicted (power)-schedule, to a coordination centre and receives a control signal in return from that centre. In some embodiments the local response to the control signal may have two states: if the control signal is in one state such as "high", power should be reduced if possible, and vice versa. Thus the control signal is a measure of whether the power being used is too high or too low—it is an indicator of power imbalance in the system (balance being understood to mean that supply and demand are optimized within the constraints). It is assumed that some or all controllers that are presently available will not understand this control signal and will not be programmed or will not be willing to send a reaction signal such as a schedule. Accordingly, another aspect of the present invention is the use of additional agents. For example, a first group of agents have means to construct the reaction signals, i.e. future schedules e.g. from historical data and/or information received from the local controller. A second group of agents has means to translate the control signal from the coordination centre into useful information for the local control unit to allow control.

Some possible application fields of the present invention are any of:
  A district with a feeder with limited capacity. End-users need to cooperate in order to reduce overall power consumption
  A district with a line with limited capacity: idem
  A transmission line with limited capacity: idem
  A set of heat pumps which cooperate to meet a common goal, like playing on an imbalance market or following a predefined consumption pattern
  A set of heat pumps which minimize the imbalance of a retailer
  A district with voltage problems, due to the installation of too many photovoltaic installations or too little capacity of the feeder or lines.
  The coordination between different actors on a distribution grid (different actors are
  e.g. the retailer, the end-user, the DSO, the producers, the BRP, etc. . . . );

FIG. 1 provides an overview of different actors that can be involved and need to be controlled in embodiments relating to electrical power; of the problems to be controlled, of their current relations and of the communication layer, i.e. the communications network, which is subject of embodiments of the present invention. The supply network is not shown.

The different actors are shown in grey shading, namely any of:
  DSO: distribution system operator, which is responsible for the distribution grid;
  TSO: transmission system operator, which has roughly speaking the same role, but limited to the transmission network (high voltage power transport);
  End-users: house-holds, industry, public sector, . . . .
  Retailers: these buy energy on markets, like the Endex, day-ahead market, . . . .
  Producers: large power production plants
  BRP: balance responsible party, which has to take care that produced and consumed power are in balance.

The main problems considered in such a network are shown in the white boxes can be any or all of:
  Controlling the reactive power in the grid or supply network;
  Controlling the power flows in the grid or supply network, e.g. so that feeders, transformers, switching stations, substations remain stable;
  Keeping the supply network operating within network constraints such as keeping the voltage, current or frequency at every grid point within predefined limits (e.g. 210-250 V);
  Controlling other power quality issues, like reducing harmonics, etc. . . .
  Balancing Power: produced and consumed power must be equal at every instance;
  Trading: depending on the market, certain trading rules have to be followed.
  The grid or network being be able to support the resulting power flows.

The connections without arrows show which actors are involved for each of the considered problems. Note that small end-users are usually not directly involved.

The present invention concerns a system or a method or components of a system that make use of a communication infrastructure, i.e. a communications network, which is shown by the bent full arrows between the actors. Each of the involved actors can send a series of scalar values as control signals (e.g. in some embodiments a comfort or imbalance parameter such as a Lagrange multiplier) expressing the discomfort or imbalance of the actor with the current and planned behavior of the end-user. In return, the end-user may return a reaction signal such as a schedule.

Within the supply network, the power consumption and production of the end-users is characterized by several quantities, like:
  Power
  Reactive power
  Harmonics For each of these quantities a different set of comfort or imbalance parameters is needed. It is very well possible that two actors have opposite aims. For example: the retailer can improve its gain on the imbalance market by increasing the consumption of the end-user, while the DSO wants to lower the consumption to elongate the lifetime of its transformer.

Useful aspects of embodiments of the present invention are:
  The solution is optimal (under conditions), meaning that with the given information no better solution can be found (from an economical perspective)
  stability is guaranteed: if a stable solution exists within the constraints of every actor, it is found
  A general framework is provided, so that every actor can optimize its own situation, keeping privacy sensitive information local (not shared).
  A framework is given so that different control schemes, used by different sets of actors can be merged to cooperate.

Accordingly, in accordance with embodiments of the present invention a system or a method or elements of the system is/are provided to provide power control. The system may comprise elements such as a coordination centre, local units and a network of cables for bringing the electrical power to the local units and a communications network which can be the same as the supply network or totally or partially separate therefrom. A specific aspect is a system or method which allows the control problem to be decomposed into sub-problems which each can be solved locally or centrally, e.g. via an iterative process.

Figure 2:
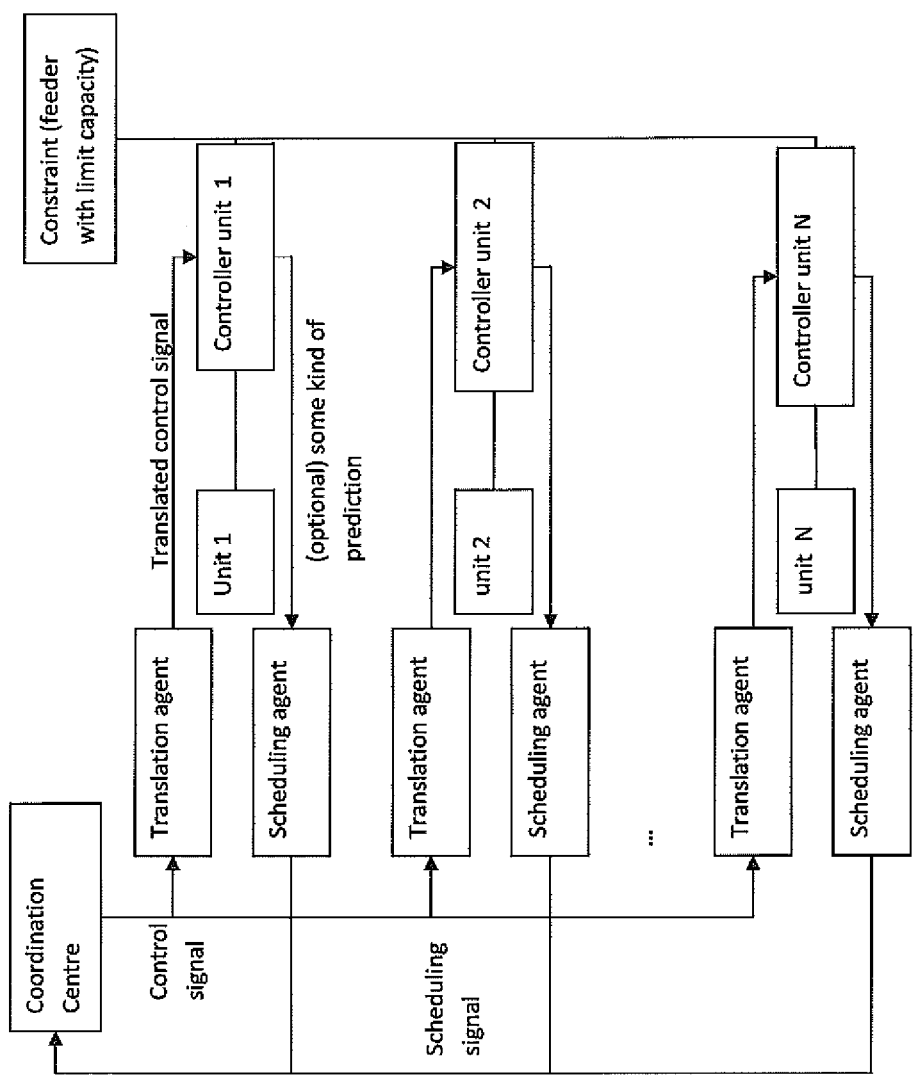
FIG. 2 is schematic overview of a coordination centre, a translation and a scheduling agent.

Referring to FIG. 2, embodiments of the present invention are based on a control signal (5) such as a Lagrange multiplier, which is updated according to a reaction signal such as a scheduling signal (7). A coordination centre (10) ensures that the considered constraint, e.g. a capacity limit on a feeder (8) is met by an iterative process involving the control and reaction signals. At the end-users side, one or two agents can be active, if required: a translation agent (2-1 . . . 2-*n*) and a scheduling agent (4-1 . . . 4-*n*), which interact with a local controller (6-1 . . . 6-*n*).

Steering Control Signal (5)

A function of the control signal (5) is to change directly a structure which alters the amount of electric power that is used. One such structure is the tariff structure, because increase of the price of electricity will result in selecting less power to be consumed and vice versa.

In embodiments of the present invention, in a control scheme in accordance with the present invention, the control signal can have the dimension of [kW/€], but this value is not a price as such but a control variable, i.e. for steering purposes. Such a steering signal "price" for example in "€" is never billed. Thus the control signal or the value kW/€ are used as a steering signal in the control system according to embodiments of the present invention. The fact that this signal increases or decreases does not mean that subscribers have to pay more or less. Any other suitable steering control variable can be used. For example, an alternative control signal can be one that relates to the modulation of the voltage, current or frequency (in an AC system). For example, if too much power is consumed (with respect to production) the voltage, current and/or frequency will drop. This can be measured by local agents at each location (3-1 . . . 3-*n*) and the measured value can be used as a control variable or to derive a control signal to decrease consumption or increase production or vice versa. Whether or not the voltage is actively used by the controller as a signal is optional.

Some alternative control signals in accordance with embodiments of the present invention can be:

- A penalty function or value as function of consumed power (PM related). If for every possible power demand, a corresponding control signal is given (like a bidding function in the PM algorithm) iterations become redundant.
- A penalty without horizon. If a single number is give to control only the actual state, the algorithm loses its prediction capacity, but becomes much simpler.
- Multiple control signals can be used: if voltage, current, phase difference between voltage and current or harmonics need to be controlled independently, it may be good to use different signals for each of these components.

Scheduling Signal (7)

If some or a majority of end-users would not use intelligent control devices, it may be cheaper or easier to aggregate them before a scheduling is made. In this case the scheduling (agent 4) would be derived for a plurality of end-users (not shown in FIG. 1). This can reduce the prediction error due to averaging.

If not power, but e.g. power quality, is the quantity to be controlled, this has to be scheduled.

In fact, the scheduling signal preferably consists of two parts. Firstly, there is the instant power consumption/prediction, which should be accurate and precise and should be in agreement with all local and common constraints. Secondly, there is a prediction part, which should be something like a best estimate, but errors are usually allowed here.

Coordination Centre (10)

For every common network constraint a coordination centre (10) preferably coordinates the behavior of all end-users. For example a feeder (8) with limited capacity has a coordination centre (10), which manages the power consumption of the end-users behind the feeder (8).

Here three aspects should be in agreement during operation of the network:

The constraint should be met

The control or steering signal (5) (e.g. a Lagrange multiplier) should be steady The reaction or scheduling signals (7) should be steady Steady means that the value of the signal should no longer evolve in the iteration scheme within an acceptable range, i.e. within a predetermined tolerance.

The present invention allows within its scope that coordination centres (10) can also work if no feedback is given from the distributed controllers (6-1 . . . 6-*n*) such as the reaction signal. In that case the coordination centers (10) send out a control or steering signal (5) and they check independently if the constraints are met, e.g. they are adapted to check directly with the feeder if the feeder (8) is not overloaded. If the feeder is not overloaded, the control signal is raised (or lowered depending upon the convention used). Once overload is detected the signal is reduced (or increased depending upon the convention used).

Both these control alternatives are included within the scope of the present invention: one with a local feedback (schedule signal 7) and one without such a signal. If meeting the constraint is measured directly e.g. on the feeder, there is still a feedback signal but only globally as to the relevant constraint and not locally as to the unit. The feedback has a much larger granularity in that case.

Many functions can be constructed to relate the scheduling signals (7), the constraint to be controlled to and the control signal (5). Embodiments of the present invention can use a kind of relaxation scheme, whereby the violation (or a possible violation or a possible future violation) of the constraint is used as a measure or control function to increase or decrease the control signal (5). The control signal (5) can therefore also be seen as a measure of how far the system is away from an optimal operation i.e. a degree of imbalance. For example, the control signal can be related to the marginal cost for changing power around the consensus point.

Other embodiments of the present invention may include any or all of

- Machine learning techniques, like a neural network (NN) whereby the NN can be adapted to learn from historical data as to how the control signal (5) should be adapted in order to reduce constraint violations. If well trained, this can work as well or better than relaxation methods, since the NN is able to correct systematic errors in the schedule signals.
- ANN can also be used to directly construct a control signal.
- Q-learning methods are an alternative for NN. Both Q-learning methods and NN can be advantageous if devices have to be controlled for which no models are available. A disadvantage can be that the controller has to learn its actions. So in the first stage its control actions may not be reliable.
- A (Markov-Chain)-Monte-Carlo method. Here the control signal is randomly perturbed in order to find optimal values.
- A control function can be used to minimize an objective function.
- Such optimization schemes are known of which a Levenberg-Marquardt or a Newton-Gauss method are examples and can be used to minimize the objective function by searching in the direction of steepest descent. The Jacobian can be constructed analytically under some conditions. In other cases numerical approximations of the Jacobian can be used. LM or NG methods can also easily be combined with MCMC. Such a combination avoids local minima (advantage of MC-methods) and has the fast convergence of LM/NG methods.

Translation Agent (2)

Since an arbitrary local controller (6-1 . . . 6-n) may misinterpret the meaning of the control signal (5) or need not be adapted to make use of the control signal (5) nor even recognize it, embodiments of the present invention can make use of a translation agent (2-1 . . . 2-n) that is installed to relate the control signal (5) to internal communication signals recognized by the controller (6-1 . . . 6-n). This translation agent makes it possible that different local control schemes can interact to meet a common constraint.

If the local controller is able to understand the control signal, the translation agent becomes redundant.

The translation agent may be provided as a separate device, e.g. a processing device with a processing engine and memory and interfaces for communicating with the local controller and the co-ordination centre or it may be implemented in the form of software that can be run on a suitable processing device such as the local controller itself.

Scheduling Agent

The scheduling agent derives a schedule from local control signals. The schedule is such that it can be interpreted by the coordination centre (10).

If the local controller is adapted to generate suitable schedules, the scheduling agent becomes redundant.

The scheduling agent can also be provided with additional properties:

e.g. it can be adapted to check if the local controller is not biased (accidentally or on purpose).

The scheduling agent may be provided as a separate device, e.g. a processing device with a processing engine and memory and interfaces for communicating with eth local controller and the co-ordination centre or it may be implemented in the form of software that can be run on a suitable processing device such as the local controller itself.

Local Controller

If the local controller works optimally, so will be the results of the overall system, but sub-optimal solutions of one controller can also be in the advantage of other controllers:

suppose that one controller charges when prices are high. The other controllers will not be able to charge at this moment, but additional capacity becomes available at other (more beneficial) moments.

Use of any kind of controller or the absence of any control scheme and hence controller is included within the scope of the present invention—but within the system at least one controller is present.

In accordance with a specific embodiment the local units are adapted to send reaction signals such as power schedules to the coordination centre, which generates a control signal e.g. in the form of a Lagrange Multiplier in response thereto and distributes this to the local units. This control signal is an indicator of imbalance in the system. The controller may be provided as a separate device, e.g. a processing device with a processing engine and memory and interfaces for communicating with the co-ordination centre and a translation or scheduling agent or it may be implemented in the form of software that can be run on a suitable processing device such as the local controller itself.

In accordance with embodiments of the present invention the system is adapted to use a Lagrange relaxation to merge common constraints in a cost function. Also in accordance with embodiments of the present invention the system is adapted to solve a dual problem that can be formulated (e.g. as a dual decomposition) in the following way: every local unit has local intelligence and digital processing power to run a solver which solves the local unit's own power use optimization problem taking into account the Lagrange Multiplier that it has received. Depending on the value of these Lagrange multipliers, (power) schedules are sent to the coordination centre from the local units. The coordination centre is adapted to receive these schedules and to update the Lagrange Multipliers and to resend these updated values to the local units. This latter communications are iterated until all constraints are met.

According to the above embodiments, the coordination centre sends a control signal to every agent involved that determines or changes its behavior based thereon. Each local unit takes this control signal into account, together with its own objectives and constraints, and (potentially) the demands of its retailer, etc. . . . and makes a schedule for the next time period, e.g. a few hours. If every unit agrees on the schedules and all constraints are met, then a first control step is implemented.

The advantages of these embodiments are one or more of:

The final solution can be an improved or an optimal solution. However it lies outside the present invention whether efforts someone is willing to make can improve the solution (for the given information) and for a given player. Every control system can be misused, e.g. one power supplier may deliberately reduce power supplied to increase the price—called gaming.

All private information (except the schedules) remains in the local solver in the local unit. So one retailer does not have to share information with a competitor.

Every local solver in a local unit solves its own problem. So the system is scalable (under certain conditions) and more complex networks with many more players become reachable.

A coordination centre is used to handle common constraints. This can be the DSO, which is adapted to operate a network constraint such as a transformer with limited capacity, a line with limit capacity, to operate to keep the reactive power within some predefined limits; or it can be the BRP, who must guarantee that every kilowatt consumed somewhere is also produced, or it can be the fuse box with a limited capacity.

There can be an option not to react to an incentive from the steering or control signal such as a Lagrange multiplier. This can be important compared to other coordination mechanisms. In these embodiments, the local unit operates its local environment and remains exclusively responsible for that environment.

A potential problem with this type of decentralized control scheme is that one cannot necessarily force every retailer to implement a system in which the communication signals mentioned above (control or steering and reaction signals) are understood. Some of the retailers may even have no communication at all in their local controllers, so any incentive given to them via the control or steering signal, e.g. Lagrange Multiplier is lost and no schedule will ever be made by a local unit in their systems.

Furthermore the controllability of the system is reduced due the presence of (near-) homogeneous sub-problems.

In order to match the different possible subsystems in such a scheme, two types of translation agents can be used. The first translation agent needs to translate the control or steering signal such as the Lagrange multiplier to a signal understood by the local optimizer of the local controller and the second needs to construct a schedule.

The agents can be separate devices, e.g. microcontrollers or processing engines with digital processing power and memory, such as FPGA's or microprocessors or they can be software that is configured to run on the processing systems of the local controllers or other local devices.

FIG. 2 gives a schematic representation of a system 1 in accordance with an embodiment of the present invention. In FIG. 2 both the communications network is shown, e.g. from the co-ordination centre to the end user and also a part of the supply network such as the feeder.

1. At every house (3-1 . . . 3-$n$) or unit, a scheduling agent (4-1, . . . 4-$n$) is present. This scheduling agent (4-1, . . . 4-$n$) is provided with local intelligence, e.g. a processor and memory and adapted to make a prediction about future behavior of its client. This can be for example the planned power consumption if a power constraint is active on the feeder (8). This prediction can be generated directly by the local controller (6-1 . . . 6-$n$) of that unit or it can be based on historical data and be constructed by the scheduling agent (4-1 . . . 4-$n$) or it can be any suitable combination of both.

2. The coordination centre (10) has intelligence, e.g. a processor and memory, and is adapted to check if all the schedules that it receives from or via the scheduling agents (4-1 . . . 4-$n$) can be followed without violating any of the common system constraints. If the latter is determined to be the case, control or steering signals (5), e.g. in the form of Lagrange multipliers will be activated and will be sent to the translations agents (2-1 . . . 2-$n$).

3. These translation agents (2-1 . . . 2-$n$) has intelligence, e.g. a processor and memory and is adapted to transform the information from the coordination centre (10) to a form which can be understood by the local controller (6-1 . . . 6-$n$).

4. The local controller (6-1 . . . 6-$n$) has intelligence, e.g. a processor and memory, and can adapt its behavior according to the control or steering signal e.g. Lagrange multiplier it receives. Optionally it can ignore the control steering signal, e.g. the Lagrange Multiplier.

5. Steps 2-4 are repeated until the constraints are no longer violated and both the schedules and control signals (5) have converged.

In this embodiment one assumption can be made about the local intelligence of the controllers (6-1 . . . 6-$n$), namely that the local processing devices, e.g. processing engine and memory are preferably programmed to cooperate to meet common constraints. So for example optionally gaming is not allowed.

The Control Signal as a Lagrange Multiplier

Embodiments of the present invention preferably have the advantage of using the properties of Lagrange relaxation and dual decomposition (distributed optimization/ADMM and other solvers for distributed control): if the Lagrange multipliers are used as the control or steering signal (5) and communicated to the local units and reaction signals such as schedules are answered in an iterative process, the global optimum for the overall system is reached in an economical manner.

This means that every local controller (6-1 . . . 6-$n$) is able, by only its own activity in combination with the coordination centre (10) to find the optimal control parameters for the device(s) under control with the information available to that controller. It is not possible that some of the local controllers could have found better results if the information at hand would be provided in a different form.

If additional information would have been at hand, like better models, better predictions, etc. . . . still better solution could be found, but in such case the DD or LR algorithm will be able to improve their results as well.

On the other hand, it is very well possible that some or all local controllers do not perform optimally because of ill-written software or other reasons.

The Translation Agent for Control or Steering Signals Such as Lagrange Multipliers The aim of the translation agent (2-1 . . . 2-$n$) is to translate the control or steering signal, e.g. Lagrange multiplier to a signal which can be understood by the local controller (6-1 . . . 6-$n$). Because the local unit can be of any type it is not defined a priori. Thus there is not one optimal translation agent but each must be adapted to the controller with which it is working. In the following a suitable translation agent will be described for a range of known controllers:

Power Matcher: in this controller the amount of power to be consumed is given as function of a price signal. The control or steering signal such as a Lagrange multiplier can be translated into a value €/MWh, and this can be added/subtracted to the allocation price to change the behavior of the end-user. Because the PowerMatcher does not look ahead, any control or steering signals such as Lagrange multipliers defined with respect to the future is not used.

Intelligator: here the amount of power to be consumed is expressed in function of a priority. If a relation between the priority and price exist, this relation can be used to translate the control or steering signal such as Lagrange multiplier to a priority scale. If this relation is absent, it can be constructed, the lowest value observed in the control or steering signals such as Lagrange multipliers during the last N days is associated with the lowest priority observed during this same period and the highest values are associated as well. For any intermediate value, a linear relation can be constructed.

Moving Horizon NMPC algorithm

With identical horizon: the control or steering signals such as Lagrange multipliers can directly be used in the optimization algorithm With shorter horizon, the values which fall behind the horizon are not used; the rest is directly implemented in the optimization algorithm.

With longer horizon: the values which are not given by the coordination centre are estimated based on historical data Blind matcher. Many retailers may not want to react to signals from the DSO for example, since this reaction will cause deviations from the standard load profiles (which are used to buy power on the day-ahead market). These deviations will cause imbalances and thus possibly higher costs on the imbalance market. Such retailers will not react at all. So the translation agent will not do anything.

The Scheduling Agent for Use with Control or Steering Signals Such as Lagrange Multipliers In order to make accurate control or steering signals such as Lagrange multipliers, the coordination centre needs to receive good reaction signals, e.g. schedules. Since some local control units cannot communicate anything or do not exist at all, the present invention includes within its scope that devices are added to generate the schedules. For example, scheduling agents (4-1 . . . 4-$n$) can be placed between the local controller (6-1 . . . 6-$n$) and the coordination centre (10). These scheduling agents (4-1 . . . 4-$n$)

may receive schedules directly from the local controller or may produce their own schedules base on historical data or combine both.

EMBODIMENTS

Embodiment 1: Voltage Stabilization in a Distribution Grid by Means of a Control or Steering Signals Using, for Example a Lagrange Relaxation Control Scheme Consider a feeder with N end-users. At the connection of every end-user the voltage V (N×T), and power p (N×T), are continuously monitored. The feeder has a restricted capacity and in this embodiment a Lagrange relaxation algorithm is used to take this constraint into account.

Voltages deviate from their optimal value V0 due to perturbations in power demand (in first order approximation)

$$V = V_0 + \frac{\partial V}{\partial p} \Delta p$$

With $$\frac{\partial V}{\partial p} = \begin{pmatrix} \frac{\partial V_1}{\partial p_1} & \frac{\partial V_1}{\partial p_2} & \cdots & \frac{\partial V_1}{\partial pN} \\ \frac{\partial V_2}{\partial p_1} & \frac{\partial V_2}{\partial p_2} & \cdots & \frac{\partial V_2}{\partial pN} \\ \cdots & \cdots & \cdots & \cdots \\ \frac{\partial V_N}{\partial p_1} & \frac{\partial V_N}{\partial p_2} & \cdots & \frac{\partial V_N}{\partial p_N} \end{pmatrix}$$

This matrix can be identified from the measured voltages and powers.

Power is (partly) controlled by the price or control signal $\lambda$ (N×1). In a first order approximation $$p = p_0 + \frac{\partial p}{\partial \lambda} \Delta \lambda$$

The derivative is the flexibility of the system or the price elasticity in economical terms and can be calculated from the Lagrange relaxation algorithm, where the price changes and the power follow these changes. Note that the term "price" refers to a control variable that can influence how much power is consumed or produced. Hence power follows price. "Price" is a control or steering variable and is not related to billing.

Combining both first order approximations $$\Delta V = \frac{\partial V}{\partial p} \frac{\partial p}{\partial \lambda} \Delta \lambda$$

Or $$\Delta \lambda = \left(\frac{\partial V}{\partial p} \frac{\partial p}{\partial \lambda}\right)^{-1} \Delta V$$

In this equation the first derivative can be measured, the second is a result from the Lagrange relaxation algorithm, delta-V is measured and delta-lambda is the price/control incentive that has to be sent to each user so that their behavior is adapted in order to stabilize the voltage network.

Since the voltage changes much more rapidly than power schedules can be adapted, it is less favourable to use forecasting algorithms or scheduling signals in the context of voltage stabilization. Instead an instant control signal is sent to every end-user. This instant control signal may vary from instant to instant. Event based implementations are included within the scope of the present invention, e.g. where the communication occurs when the system changes and not at predefined moments.

If a classical Lagrange relaxation algorithm would have been used, a coordination centre is needed at every node in the network. This would lead to a communication overload. Instead, in embodiments of the present invention, a coordination centre at the central feeder is allowed to send different control signals to every end-user in order to keep voltage stable. The advantage is that only one coordination centre is needed.

Embodiment 2: Coordination Method, System and Network Elements for Retailers, Balance Responsible Parties and End-Users on a District Level The present embodiment relates to a coordination strategy which takes the interests of retailers, end-users, distribution responsible operator (DSO) and the balance responsible party (BRP) into account. It allows the different participants to share a common network infrastructure, without violating network constraints. This embodiment comprises a smart grid equipped with a two-way communication system. Each participant exchanges information with others through the communication infrastructure in order to converge to the optimal power consumption schedule and optimize its own local objectives without sharing private information with other users. This strategy will be illustrated on a district level with quite a lot of heat-pumps, so that coordination between the end-users becomes necessary in order to avoid overload of the distribution network. In addition, it can be shown that the solution found is the global solution for the problem, meaning that no better solution can be found.

This control framework can be used with different tariff structures which can affect the stability of the network. For example, single and day/night tariff structures show that price variations provoke load synchronization and lead to network overloads. With a Time-of-Use tariff structure, if each heat-pump optimizes its behavior to minimize personal costs, no incentive remains to reach common constraints, like total power supply. If power constraints are imposed, the same network can be stabilized, even if power demands increase with a factor three or four.

Lastly, based on imbalance cost the cluster can be guided to maximize profits on the imbalance market.

A cluster of companies and actors are involved in generation and control of electric power before power reaches the end-users. Producers need to find retailers to sell their power. If end-user's consumption deviates from the expectations made by the retailer, the mismatch needs to be traded on an imbalance market (a Balance Responsible partner (BRP) is in charge of this function). Overall, the produced, consumed and imbalance power needs to be in balance. To transport the energy to the end-users, Transmission System Operators (TSO) and Distribution System Operators (DSO) need to agree in order to maintain the power supply. If power flows become too large in some nodes of the grid, reliability of power supply can no longer be guaranteed. Each of these actors has its own specific role and operation and has to take particular constraints into account. In accordance with embodiments of the present invention a framework for automated smart grids is provided allowing actors to compete and/or cooperate at the same time to maximize efficiency within the hardware limitations of their own devices and of the power grid.

Take for instance electrical vehicles and heat pumps. In large numbers these devices will challenge the power-supply reliability of the grid since one such device can consume the same power as a household. The hardware solution is to increase the capacity of the (distribution) grid, but this is expensive, since the grid needs to be dimensioned for some rare occasions when all heat pumps switch on. An alternative, often encountered in literature is to implement Demand Side Management (DSM). Here some of the electrical devices can communicate and can actively help to support the reliability of the grid by controlling demand side power requirements.

A range of approaches have been proposed in literature ([2] [3], [4], [5]), but little attention is given to the will to cooperate between the different actors. One may doubt if all end-user will be willing to give the control of their devices to a third party. Before proposing solutions a brief overview of existing methods is given.

A first class often encountered in literature are so-called direct control methods ([6], [7]). Here consumers and producers aggregate all information and a central unit computes the optimal schedule, taking into account all local and global constraints. Next individual control actions are sent to each device. These approaches have the advantage that the optimal control action can be computed, but this can become difficult for large clusters. An additional problem is that each participant needs to share private data and constraints with a third party and must be willing to transfer the control of its device(s). This may hinder a large scale implementation, since all participants must be willing to transfer the control of their devices or to share data which is privacy sensitive [8].

A second class consists of distributed optimization approaches ([3], [4], [5] [9]). In those methods, each device solves its private optimization problem. Common (linear) constraints are merged into the personal utility functions by means of a Lagrange relaxation approach.

The main advantages are
(i) the scalability of the system: large clusters can be controlled, since the computations are performed locally;
(ii) In case the communication lines break down, the individual controllers keep functioning and outdated values for the Lagrange multipliers are known by each device and can still be used [5].
(iii) Privacy issues are handled better. Not all personal constraints and other information needs to be shared. Still, the power schedule needs to be passed to a third party. From this schedule a lot of sensitive information can be decoded, like when people are at home, etc. . . .
(iv) The computation problem becomes tractable [see for example: Convex Optimization, Stephen Boyd and Lieven Vandenberghe, Cambridge University Press]
(v) Distributed intelligence can make the system more robust against communication breakdown and can allow for a better performance for local control Besides this privacy issue, this approach has two other major disadvantages:
(i) To meet the global constraints, an iteration scheme has to be followed, where in each iteration the Lagrange multipliers are updated based on the power schedules and vise versa. These iterations cause more communication.
(ii) Implicitly it is assumed that each participant is cooperating to optimize the global utility. In practice some participants may optimize their own profit and to do so, they may deviate from the global utility.
(iii) The utility functions must be convex.
(iv) Binary control actions and homogeneous subproblems
(v) Local intelligence required
(vi) The number of iterations required is not deterministic and partially depends on the price elasticity of the stakeholders.

Embodiments of the present invention are variants of this approach.

A third class bases its strategy on game theory [see for example Hamed Mohsenian-Rad, Vincent W. S. Wong, Juri Jatskevich, Robert Schober, and Alberto Leon-Garcia, "*Autonomous Demand Side Management Based on Game-Theoretic Energy Consumption Scheduling for the Future Smart Grid*," IEEE Transactions on Smart Grid, vol. 1, no. 3, pp. 320-331, December 2010.]. Here it is not assumed that all players cooperated to meet a global objective. Instead players are assumed to be competitors. This may be closer to reality and is for that reason a large step forward. However, at this stage, this method is still confronted with some problems:
(i) each device has to communicate with each other device, which will lead to a communication overload for large clusters;
(ii) Quite severe restrictions hold for the utility function. It still needs to be strictly convex.

A fourth class consists of agent based approaches which employs heuristic rules to schedule devices ([10], [11], [12]). Take for instance the PowerMatcher [see for example Koen Kok, Martin Scheepers, and Rene Kamphuis. Intelligence in electricity networks for embedding renewables and distributed generation. Chapter in: R. R. Negenborn, Z. Lukszo, and J. Hellendoorn, editors, *Intelligent Infrastructures*. Springer, Intelligent Systems, Control and Automation: Science and Engineering Series, 2009.]. In brief, each device sends out a so-called bidding function, where the amount of power is given as function of a price. The aggregator finds a match between all these bidding functions and sends an allocation back to each agent. This procedure is repeated for each time interval. The main advantages are that these algorithms are intuitive, easy to implement and to understand, scalability is easy and some of these strategies have already been tested in the field and do perform well [ECN 2]. However the match is static and this makes it difficult to take dynamic effects into account or to take any prediction or future aspects into account. A second disadvantage is that optimality cannot be guaranteed. In fact, anyone can come up with his/her own set of rules and under some conditions these will perform well or reasonably or may become unstable.

The present embodiment provides a power supply network control method and a framework where common constraints are met, but where each player can optimize its own operation, taking into account its own private constraints. Aggregating all information in a central computer is therefore impractical. In accordance with this embodiment, by iterating real-time control signals that indicate a degree of power imbalance of the network, the same optimal solution can be computed in a distributed way, without sharing confidential information.

Elements of the present embodiment include: an optimal distributed control algorithm, current tariff structures and a Time-of-Use (ToU) scenario. Load synchronization may cause problems and can be avoided by taking the network limitation into account as a common constraint. Within a ToU scenario is that the end-users may change their behavior and thus change the standard-load profiles. This may cause larger imbalances on the network. Taking imbalance costs explicitly into account may reduce the imbalance costs.

The present embodiment provides a control algorithm which allows all actors to cooperate to meet common constraints, without sharing all private information. A practical advantage is to be able to help the DSO to keep the distribution grid stable, without having to update the hardware. Of course several actors have to deviate from their optimal planning and will have to make some losses. If these losses can be recovered from the DSO, the latter can decide to keep taking sporadic losses or to upgrade its hardware. As such a market based incentive is created for the DSO to provide balance, to intervene in the end-users behavior or to invest.

However, the introduction of heat pumps on a large scale can cause severe problems to the grid. Firstly, compared to the residential loads, these heat pumps consume quite a lot of power, typically 2-5 kW electric each. During cold periods, the majority of heat pumps will be working, which can increase the average power consumption of each household from about 1 kW to 4 kW. The distribution grid can deal with individual households consuming such amounts of power, but may not be equipped to deal with a district, where many households are consuming such amounts of power.

Secondly, heat demand depends on the outside temperature, which is identical for all house holds in a district. This causes a large synchronization in the power demands of heat pumps, which will only make power overload worse.

These two problems are more generic and can easily be extrapolated to e.g. electrical vehicles, while the power quality problem is specific. The most robust solution is to increase the capacity of the network which is probably also the most expensive solution. Not only the transformers need to be upgraded, but also power lines. Embodiments of the present invention provide an alternative solution implementing Demand Side Management (DSM). If the heat pumps can communicate to find some kind of agreement on a schedule, the existing network can further be used.

The DSM manages the consumption and production of the members in a cluster, and makes use of their flexibility. The flexibility of consumers is their potential to shift or even cancel their consumption. In contrast with electrical energy, heat can be stored easily and more efficiently and at less cost, which makes heat pumps very flexible devices in a DSM network. Managing the flexibility of a large cluster, without putting the reliability of the existing grid at risk [1], can be regarded as a constraint optimization problem and can be a challenging task.

A distribution net is first considered, so the TSO is not taken into account. In addition, only dumb loads and heat pumps will be considered. In contrast with electrical vehicles, a heat pump can already compete economically with conventional heating installations. One may expect reasonably that heat pumps will become popular in the near future, because of increasing prices for fossil fuels and environmental awareness.

For example, in a typical Belgian district, the transformer used to distribute power is typically dimensioned so that 2-4 kW can be provided to each household. The average consumption varies around 0.8 kW with peaks up to a few kW. Since these peaks do not occur simultaneously this system works well. Problems can arise when in unusual districts the majority of people decide to use heat pumps to heat their homes.

Let us assume that the district under consideration consists of 100 household, which are equally distributed over the three phases of the electrical supply. So only one phase will be considered. The transformer can supply 240 kVA, which is 2.4 kVA per household on the average. 34 households are connected on the relevant phase. Cross-correlation between the different phases will not be considered. Dumb loads are based on measured consumption patterns (with a average consumption between 3500 and 4000 kWh). Simulations are performed during one week in February, when heat demand is high. During this winter period, heat pumps can triple the power consumption per household, which brings the overall consumption close to the network limits. This might very well be possible that in an unusual district, which will be equipped with a lot of heat pumps, the thermal insulation of the houses will be much better and the heat demand will be lower. Typical values for heat and hot water demand can be found in FIG. 3.

Figure 3:
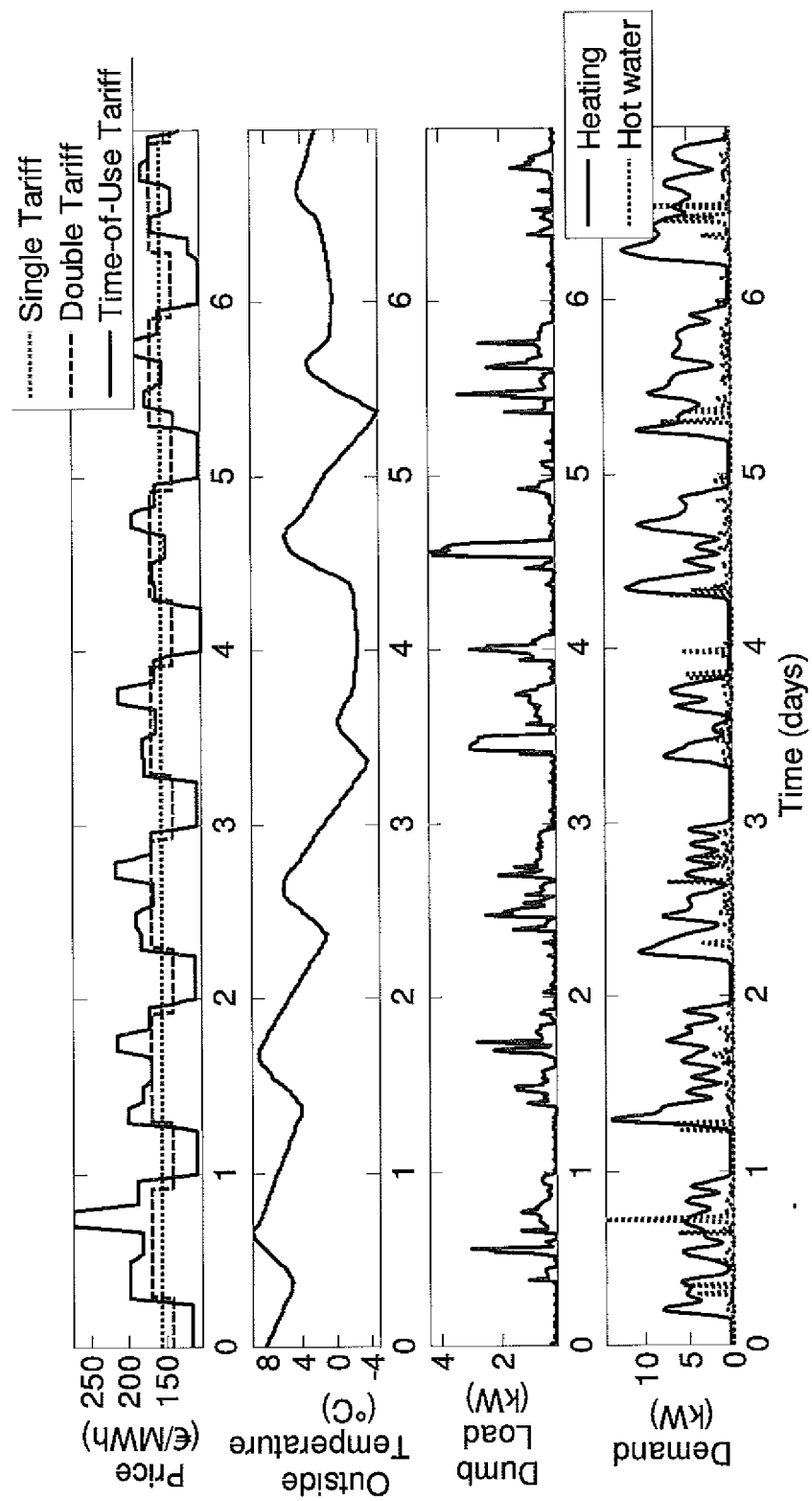
FIG. 3 shows stochastic variables. Dumb loads and demand very from end-user to end-user.

Four types of actors are considered:
End-users: the consumption of each household consists of an uncontrollable load and the consumption of a controllable heat pump. The uncontrollable load is based on in-house measured consumption patterns of typical Belgian households. One such dumb load in shown in FIG. 3. The heat-pumps are described in details below.
Retailers provide the energy to the end-users and buy this energy on a day-ahead market. Several tariff structures are compared as a test-case. As a benchmark, the current tariff structures are used: a constant price (155 €/MWh) and a double tariff structure, with a high price from 7 a.m. to 10 p.m. (170 €/MWh) and a low price during the night (140 €/MWh). Next an unconstrained ToU scenario is examined. The prices used are shown in FIG. 3.
Balance Responsible party (BRP): if the retailer and end-users do not match, the imbalance is compensated by the Balance-Responsible-Party. Two cases are considered. In the first one the retailer pays a fixed fee to the BRP and does not have to care about the imbalance. This is typically the case for small retailers. Secondly, the case is considered where the retailer and BRP are the same party. In this case, the imbalance has to be compensated on nationwide imbalance market.
The DSO is responsible for the distribution network. In this paper, we will not consider the topology of the network, so the role of the DSO is limited to the maintenance of the transformer and to assure that the total consumption is bounded by its capacity.

The Heat Pump Model

Figure 4:
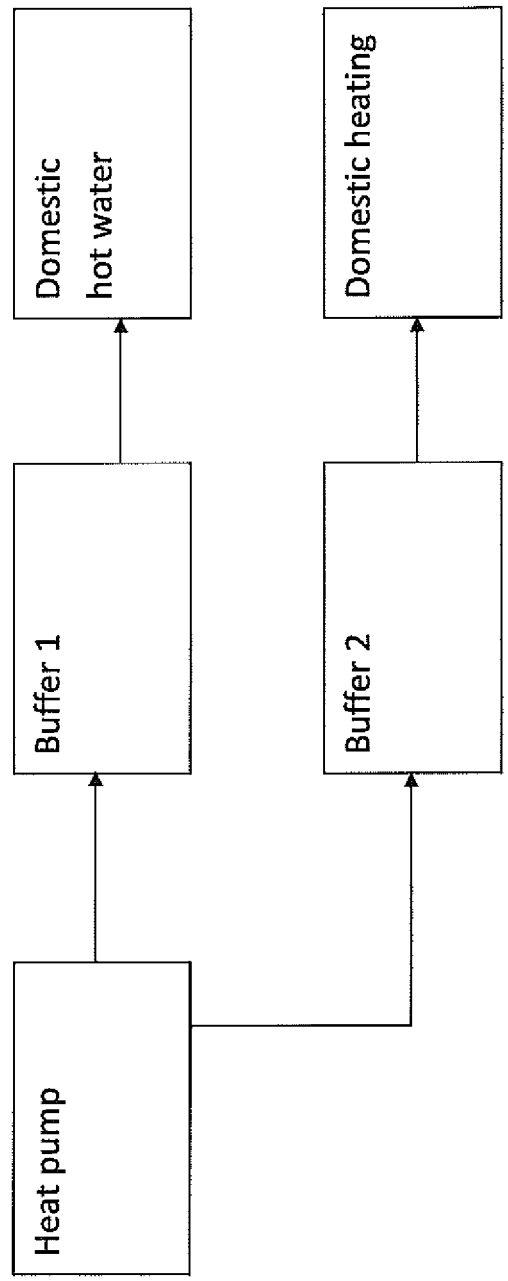
FIG. 4 shows a schematic representation of a domestic system.

A schematic representation of the heat pump installation is given in FIG. 4. The heat pump is connected to two buffers. The first is used for hot water supply and the second for heating. Both buffers have a volume of 300 L. Profiles of hot water demand are gathered from [13]. A typical household with an average demand of 300 L/day at 45° C. is used. The data for heat demand are simulated with TRNSYS and are shown in Figure. External temperature profiles are taken from Meteonorm V5, provided within the TRANSYS module. For every end-user an unique profile is generated.

A simple linear model is used to simulate and control this system. The power used by the heat pump can be modulated and the Coefficient-of-Performance (CoP) is fixed to three. The heat is divided over the two buffers:

$$CoP*p_{i,t}^{elec} = p_{i,t}^1 + p_{i,t}^2 \qquad 1$$

With $p_{i,t}^{elec}$ the electrical power used by the HP of house i at time $t*T_s$, with t a time index and $T_s$ the sample period $p_{i,t}^1$ and $p_{i,t}^2$ are the thermal powers supplied to both buffers. Energy loss in the buffers is neglected, so the energy changes in the buffers is given by $$E_{i,t-1/2}^1 - E_{i,t+1/2}^1 = p_{i,t}^1 T_s - H_{i,t}^1$$

$$E_{i,t-1/2}^2 - E_{i,t+1/2}^2 = p_{i,t}^2 T_s - H_{i,t}^2 \qquad 2$$

With $H_{i,t}^*$ the heat demands of both buffers (*can be 1 or 2). Internal energy in each buffer is calculated on a staggered grid [14]. The stored energy cannot be measured directly. Instead the mean temperature in the buffer is used as measure for the state-of-charge. The temperatures and energy are simply proportional:

$$T_{i,t-1/2}^* = \frac{E_{i,t-1/2}^*}{c_w V^*} \qquad 3$$

With $c_w$ the specific heat capacity of water and $V^*$ the volume of the buffer. The temperature for het water is bounded between $$\underline{T}_1 = 40° \text{ C.}$$

$$\overline{T}_1 = 55° \text{ C.} \qquad 4$$

And the heat buffer limits vary linearly with the outside temperature (see FIG. 3)

$$\underline{T}_2 = 22° \text{ C.} - 0.43(T_{exterior} - 20° \text{ C.})$$

$$\overline{T}_2 = \underline{T}_2 + 10° \text{ C.} \qquad 5$$

Distributed Control Algorithm

First a global utility function will be defined. Solving this function may not be practical, but, in principle, the solution has remarkable properties: all constraints are met, the overall costs are minimized and this minimum is a global minimum, so no better solution can be found with the information at hand. Evidently solving this equation will practically become impossible and every actor needs to share all of its private limitations and information. So instead of optimizing this overall utility function, a dual problem will be formulated (so-called dual decomposition [15]). This dual problem is a relaxation of identical to the overall optimization problem, so its solution has the same nice properties, but it is also distributed over the different actors. This has two important consequences. Firstly, every actor can solve its own optimization problem and does no longer have to share private limitation and private information. Secondly, since every actor can optimize its problem in parallel, systems with large amounts of actors become solvable. The downside is that the common constraints need to be distributed over the actors as well. This is done by introducing a penalty term, which needs to be iterated until all constraints are met. This iterative procedure does slow down the optimization process, does blow up the communication overhead and needs predictions from all actors involved. These predictions are based again on the private information from the actors. So still some information must be provided in order to solve common constraints.

The minimization of the global utility function on a district level is formulated below:

$$\min_{\substack{E_{i,t}^1, E_{i,t}^2, \\ p_{i,t}^1, p_{i,t}^2, p_{i,t}, p_t, \\ \Delta_t^+, \Delta_t^-}} \sum_{t=0}^{M} \sum_{i=1}^{N} f_i(p_{i,t}) + h(p_t) + g(\Delta_t^+, \Delta_t^-) \qquad 6$$

Subject to:

| Equations (1-5) | $\forall t, \forall i$ | |
|---|---|---|
| $0 \leq \Delta_t^+ \leq \overline{p}$ | $\forall t$ | 7 |
| $-\overline{p} \leq \Delta_t^- \leq 0$ | $\forall t$ | 8 |
| $0 \leq p_t \leq \overline{p}$ | $\forall t$ | 9 |
| $\sum_{i=1}^{N} p_{i,t} \leq \overline{p}$ | $\forall t, \forall i$ | 10 |
| $\Delta_t^+ + \Delta_t^- = \sum_{i=1}^{N} p_{i,t} - p_t$ | $\forall t$ | 11 |

With $p_t$ the total power consumed by all heat pumps and dump loads. The upper limit for this power is $\overline{p}$. The functions $f_i(p_{i,t})$, $h(p_t)$ and $g(\Delta_t^+, \Delta_t^-)$ are defined later in this paragraph, but represent the respective costs for end-users and retailers. The imbalance is decomposed in two terms, a $\Delta_t^+$ which accounts for a surplus of power and a $\Delta_t^+$ for a deficit of power in the cluster.

Equations (1-5) describe the dynamics and limitation of the heat pumps installed at the end-users. Equation (2-4) limits the positive and negative imbalance to the capacity of the transformer. Equation (9-10) limits the total power delivered by the retailer and consumed by the end-users respectively. Equation (11) relates the mismatch between the retailers and end-users on the one hand and the imbalance on the other hand.

Only equations (10-11) are constraints with common variables and are substituted in the object function by the method of Lagrange multipliers so (1) becomes $$\min_{\substack{E_{i,t}^1, E_{i,t}^2, \\ p_{i,t}^1, p_{i,t}^2, p_{i,t}, p_t, \\ \Delta_t^+, \Delta_t^-}} \sum_{t=0}^{M} \sum_{i=1}^{N} f_i(p_{i,t}) + h(p_t) + g(\Delta_t^+, \Delta_t^-) \dots + \qquad 3$$

$$\gamma_t^1 T_s \left( \Delta_t^+ + \Delta_t^- - \sum_{i=1}^{N} p_{i,t} + p_t \right) + \gamma_t^2 T_s \left( \overline{p} - \sum_{i=1}^{N} p_{i,t} \right)$$

Subject to Equations (1-5, 2-9)
Which can be decomposed in three sets of solvers
End-users' problem $$\min_{\substack{E_{i,t}^1, E_{i,t}^2, \\ p_{i,t}^1, p_{i,t}^2, p_{i,t}}} \sum_{t=0}^{M} f_i(p_{i,t}) - (\gamma_t^1 + \gamma_t^2) p_{i,t} T_s \qquad 13$$

Subject to

Equations (1-5)

For a given set $\gamma_t^1$ and $\gamma_t^2$ this equation and its constraints are all defined within one household and can, in principle, be solved locally in a domestic smart grid device. The local stage cost $$f_i(p_{i,t}) = \lambda_t p_{i,t} + \varepsilon p_{i,t}^2 T_S \quad (14)$$

The second quadratic term takes losses into account, but is in fact added to make the equation strictly convex, which makes convergence easier. Techniques like ADMM or primal averaging do not need this property to converge. Retailer's problem $$\min_{p_t} \sum_{t=0}^{M} h(p_t) + \gamma_t^1 p_t T_s \quad (15)$$

Subject to

Equations (9)

In this equation and its constraints only the retailer is involved, so in a smart grid world it becomes his concern to manage $p_t$. Depending on the business case under consideration $h(p_t)$ can take different shapes:

In a Time-of-Use scenario, the price $\lambda_t^{DAM}$ is given in advance. This can be the allocation price on a day-ahead market for example. The stage cost is given by $$h(p_t) = \lambda_t^{DAM} p_t T_S + \varepsilon p_t^2 T_S^2 \quad (16)$$

with $\varepsilon$ a scaling parameter which takes transport losses into account and is usually small (1 to 5%). $\lambda_t^{DAM}$ is the price at which the retailer has bought energy. In reality part of this energy is bought with long term contracts and part e.g. on a Day-Ahead-Market (DAM). For simplicity, we assume that the retailer's price is simply 50% of the end-users price. The remaining 50% are taxes, losses and distribution costs.

BRP's Problem

Usually the motives of the retailers are not to find an exact match between the scheduled power and the real consumed power, but to maximize profits. Under certain condition, deviation can be beneficial $$\min_{\Delta_t^+, \Delta_t^-} \sum_{t=0}^{M} g(\Delta_t^+, \Delta_t^-) + \gamma_t^1 (\Delta_t^+ + \Delta_t^-) T_s \quad (17)$$

Subject to

Equations (2,4)

This equation takes imbalances into account and can be solved independently from the solvers (11) and (13). The term $g(\Delta_t^+, \Delta_t^-)$ can be $$g(\Delta_t^+, \Delta_t^-) = -((\lambda_t^+ - \lambda_t^{DAM})\Delta_t^+ + \lambda_t^- \Delta_t^-) T_S + \varepsilon(\Delta_t^+ + \Delta_t^-)^2 T_S^2 \quad (18)$$

Where $\lambda_t^+$ and $\lambda_t^-$ are the imbalance costs. The first term in this equation associates a cost or profit to the imbalance and the second term takes losses into account. Decomposing the imbalance in a positive and negative term has an important advantage: as long as $|\lambda_t^+ - \lambda_t^{DAM}| < |\lambda_t^-|$, the positive and negative imbalance cannot be different from zero at the same time.

These equations cannot be solved completely independently, because they all contain the Lagrange multipliers. This multiplier can be found in an iterative way, e.g. by a sub-gradient method, $$\gamma_{k+1,t}^a = \gamma_{k,t}^a + \alpha^a \left( \Delta_t^+ + \Delta_t^- - \sum_{i=1}^{N} p_{i,t} + p_t \right) T_S \quad (19)$$

$$\gamma_{k+1,t}^b = \gamma_{k,t}^b + \alpha^b \min\left( \left( \overline{p} - \sum_{i=1}^{N} p_{i,t} \right) T_S, 0 \right) \quad (20)$$

With ($\alpha^a$, $\alpha^b$) being tuning parameters, which are typically proportional to 1/N.

For each new set of values for ($\gamma_{k,t}^a$, $\gamma_{k,t}^b$) the solvers (12, 15 and 17) have to be solved again. The initial value is $$\gamma_{0,t}^a = 0$$

$$\gamma_{0,t}^b = 0 \forall t \quad (21)$$

Accordingly a decomposition algorithm is provided, which divide the smartness of the grid in those players which legally and factually occur. Each player has to optimize its own profit, taking into account its own private constraints and comfort zones and decides finally how much power is traded.

Prediction Model

These control schemes all depend on unknown variables, such as the heat and tap water demand ($H_{i,t}^1$, $H_{i,t}^2$), the outside temperature ($T_{exterior}$), the energy price and imbalance prices ($\lambda_t$, $\lambda_t^+$, $\lambda_t^-$) and the future dumb load ($p_t^{dumb\ load}$). For the present analysis it is assumed that all that is available for these stochastic variables is historical data and these are used to predict future values. Many advanced techniques exist to predict future values from historical data [e.g. see Automatic Autocorrelation and Spectral Analysis Broersen, Petrus M. T., Springer], but a simple rule can be used to make predictions: each variable shows a strong daily cycle and the average value over the last five days can be used as a measure for the next day $$x(t) = \frac{1}{P} \sum_{k=1}^{P} x\left( t - \frac{T}{T_s} k \right) \quad (22)$$

With T=24 h, x the variable to be predicted and t the time in hours. As a consequence, neither weekends nor holidays are taken into account here, but these can easily be taken into account if necessary. Also no stochasticity is taken into account.

Model Implementation

Figure 5:
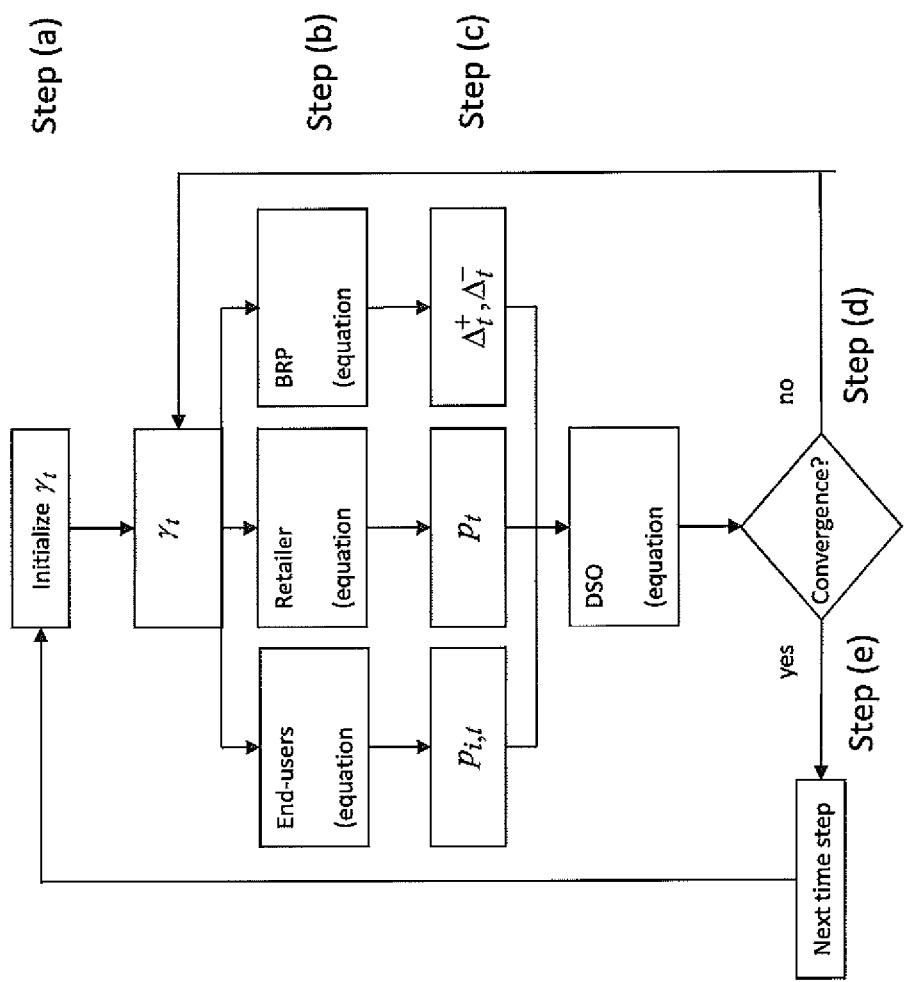
FIG. 5 shows a flow chart of a rolling horizon process.

The scheme proposed in the previous paragraph gives each actor a set of optimal control parameters. However, the models used are not perfect and stochastic variables will deviate from the expected values. As a result, the control parameters will deviate from the current values as new information can be taken into account. To circumvent this problem a rolling horizon algorithm can be used. Here the control scheme is recalculated every 15' with the information at that moment at hand. Only the first control parameters are implemented. FIG. 5 summarizes this:

Step a: the Lagrange multipliers are initialized;
Step b: the end-users, retailers and imbalance solvers are computed (equations 12, 15 and 17 are solved);
Step c: the Lagrange multiplier is updated;
Step d: if the Lagrange multiplier has not converged, steps b and c are repeated;
Step e: the rolling horizon process is repeated for the next time step.

For this scheme to be implemented in a real case, we assume that

Every consumer has a bidirectional communication device which can receive the Lagrange multipliers and can sent out the expected power to be consumed;

Each household has an optimization device which can solve equation (3), So does the DSO and Imbalance responsible party;

Lagrange multipliers, local power consumption, total power consumption and imbalances are communicated fast enough so that an equilibrium can be reached;

Simulation Results

The proposed algorithm has been tested on some test-cases. As a bench-mark experiment, a flat one-tariff structure is used. In this case, no price incentive is given, so the heat-pumps are only driven by hot-water and heat demand. In a second test-case a double tariff structure is used. Here we may expect the heat-pumps to avoid the high tariff periods. Finally two Time-of-Use tariff structures are tested. In the first, the constraint on the transformer is relaxed. This resembles the case if a ToU scenario would be enrolled today. As it turns out, the power limits are quite often violated and for that reason this experiment is repeated with all constraints active.

In all these experiments, the BRP is not considered, but it is shown that the power consumption of smart devices, which react to price incentives are harder to predict. This is very logical since an additional source of uncertainty is introduced. For that reason, trading on the imbalance market is incorporated.

All software is written in matlab. The numerical optimization is performed with the cvx-toolbox. On a Intel® Core™ i5-2520 M CPU @ 2.50 GHz, 773 Mhz and 3.16 GB of RAM each time step is performed in a few seconds at most.

a. Single and Two-Tariff Structures

Currently, only single and double tariff structures for domestic end-users are available in Belgium. In the first, the price does not vary with time and gives no incentive at all to the end-users to change their behavior. To encourage end-users to consume power during night a double tariff structure has been introduced. From 10 pm to 7 am end-users can consume at a reduced tariff. In fact, this reduced tariff is also valid during weekends, but these are not considered here. In fact, both tariff structures are proposed by the retailer. The latter is an incentive for end-users to consume less during the day, when the retailer has to pay more for power. Currently the DSO is not involved. However, if consumption doubles, these tariff structures are no longer neutral for the DSO and new equilibria have to be found.

Figure 6:
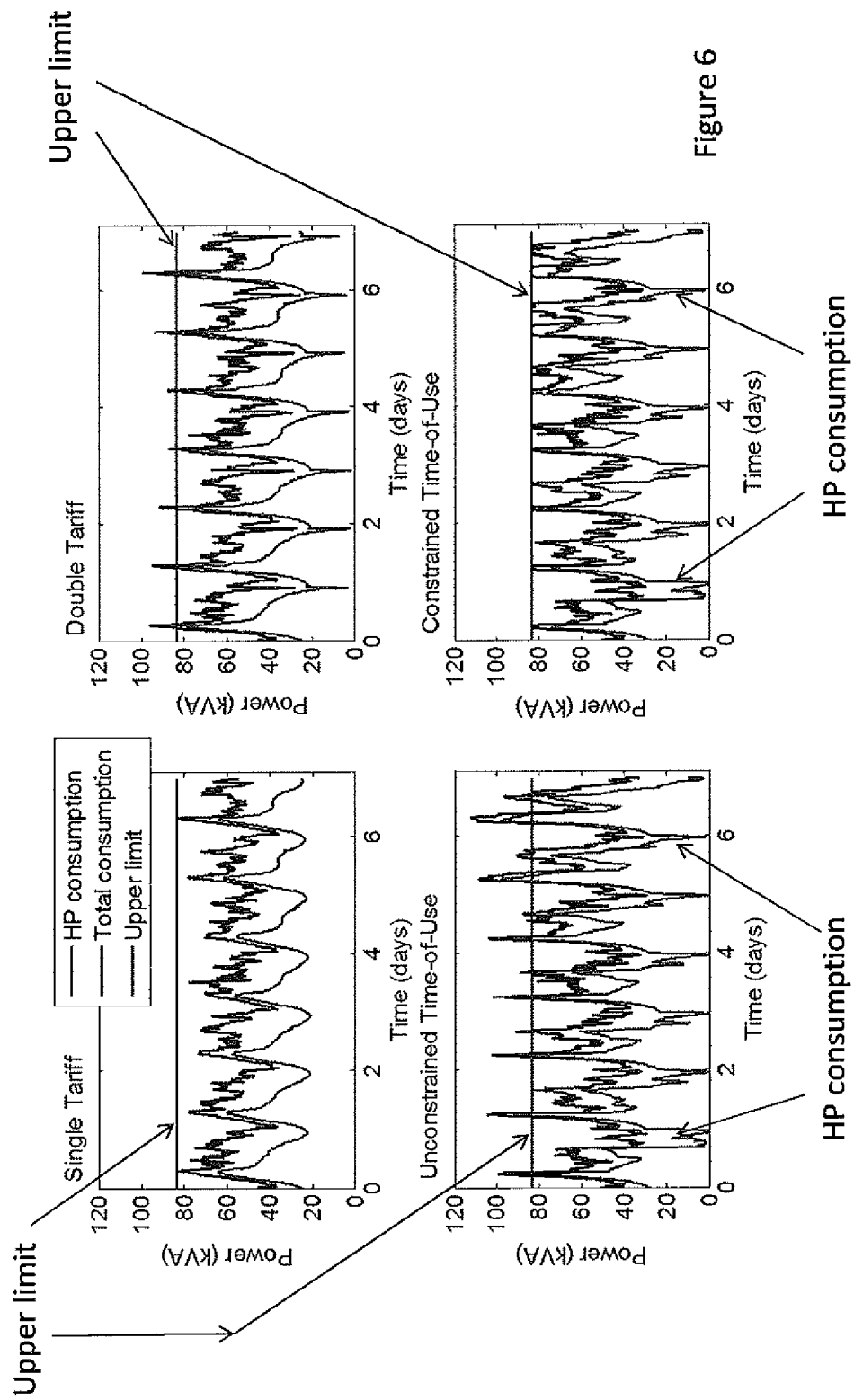
FIG. 6 shows a power consumption for different pricing and control strategies.

The results of all simulations are shown in FIG. 6. Overall, it seems that the single tariff structure can still cope with this augmented consumption pattern. The peaks in heat demand fall early in the morning, while the power peak is later in the day. Due to this shift in peak load, the power limit is not exceeded in this example.

In a double tariff structure, heat pumps fill their buffers just before 7 am and postpone their consumption until 10 pm if possible. This can be seen in the sharp peak just before 7 am each day. Little heat and hot water is demanded after 10 pm. So the only effect noticed is a sharp decrease in power consumption just before 10 pm.

The peak demand at 7 am caused almost every day a small violation of the power limits: 3.4% of the limit is exceeded with an overall over consumption of 135 kVA. So if the retailer gives an incentive to the end-user to change its behavior, this causes a synchronization of the heat pump activity and an increased pressure on the DSO.

b. Unconstrained ToU Scenario

One of the first scenarios to enroll the smart grid may be a Time-of-Use scenario, where the energy price may vary during the day, but where the price is fixed 24 h in advance. This is in contrast with the real-time-pricing scenario, where the price can vary at any time.

Note that in such a ToU-scenario, the retailer is able to manage its risks better and pass peak prices to the end-user. In return, the end-user can profit at different moments from low prices.

However, changes in the local power consumption will not affect the trading price and thus nor the retailer nor the DSO receive information about planned power consumption and cannot alter the behavior of the end-users. This is illustrated in FIG. 6, where the overall power consumption is shown. Limits on power consumption are violated much more frequent then in the two previous cases. 13 Percent of the time the limits are crossed with an overall excess over 1 MVA in one week. End-users will switch on their heat pumps if the prices are low. In addition, in this case low prices coincide with the peak in heat demand. Since all end-users see the same price signal and experience almost the same heat demand, they will behave almost identical, resulting in these peaks in power demand. So it seems from this simulation that a Time-of-Use tariff structure combined with flexible end-users will probably cause more problems than the current price scenarios from the DSO.

Figure 7:
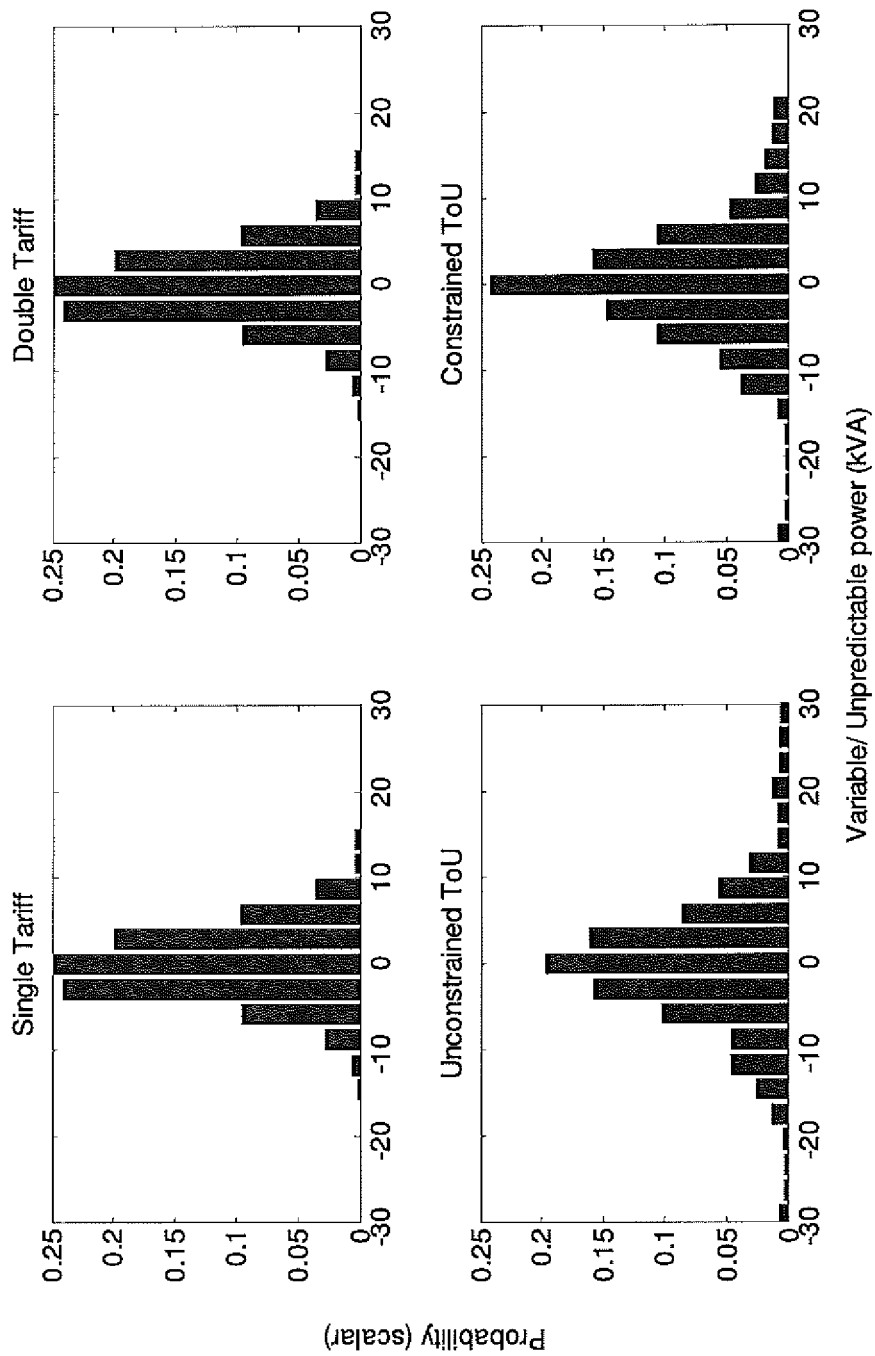
FIG. 7 shows a histogram of a stochastic variation of the power.

A second problem which comes to the front is predictability. Time-of-Use scenarios may seem handy for the retailer, because a price incentive can be given to the end-users so that consumption is lowered when prices peak. These prices are formed in advance, when the retailers and power producers trade on e.g. the day-ahead market or with long term contracts. In both cases, the retailer bases its strategy on the standard-load-profiles of the end-users. If end-users have no or very little flexible devices or when price incentives are absent, the retailer can predict the consumption within acceptable errors. This is exemplified in the periodicity of the power consumption for the single and double tariff structure. However, when the price signal becomes more complex, so does the consumption pattern, which makes it much harder for the retailer to predict future consumption. The average signal over the last 7 days is used as an example. As estimate for the stochastic and thus unpredictable part, this SLP was subtracted from the real power consumption patterns. This is illustrated in FIG. 7, where the histograms of this residual are shown. There is hardly any difference between the single and double tariff, nor is there a difference between the unconstrained and constrained ToU residuals. However, the root-mean-square values almost double (single and double tariff structure: 4 kVA, for the ToU structure: 9 kVA). This illustrates that it will become more difficult to predict future consumption in a ToU tariff structure with flexible devices. So the retailer may save some costs by passing peak prices, but may create others on the imbalance market.

In conclusion, if smart grids are enrolled to locally stabilize the power grid so that renewable integration becomes possible on a large scale, this seems not directly compatible with a ToU price scenario. It will complicate the role of both the retailer and DSO. Limits on the total power production need to be examined and finally trading on the imbalance market is examined.

c. Constrained ToU Scenario

Within this Lagrange-relaxation scheme for optimal and distributed control, common constraints can easily be incorporated. Here the limit on common power consumption is made active. If too many heat pumps plan to switch on simultaneously, this constraint will become active and the Lagrange multipliers will increase until it becomes disadvantageous for certain heat pumps to continue working and those will change their schedule so that no limits are violated, Evidently, they will only do so if the demanded heat can be supplied In FIG. 6 the power consumption is shown with active constraints is shown. Within the bounds of the numerical precision, the power limit is never violated. Most of the time this constraint is not active and the behavior of the system is similar to the unconstrained ToU system.

d. Minimization of the Imbalance Cost

Figure 8:
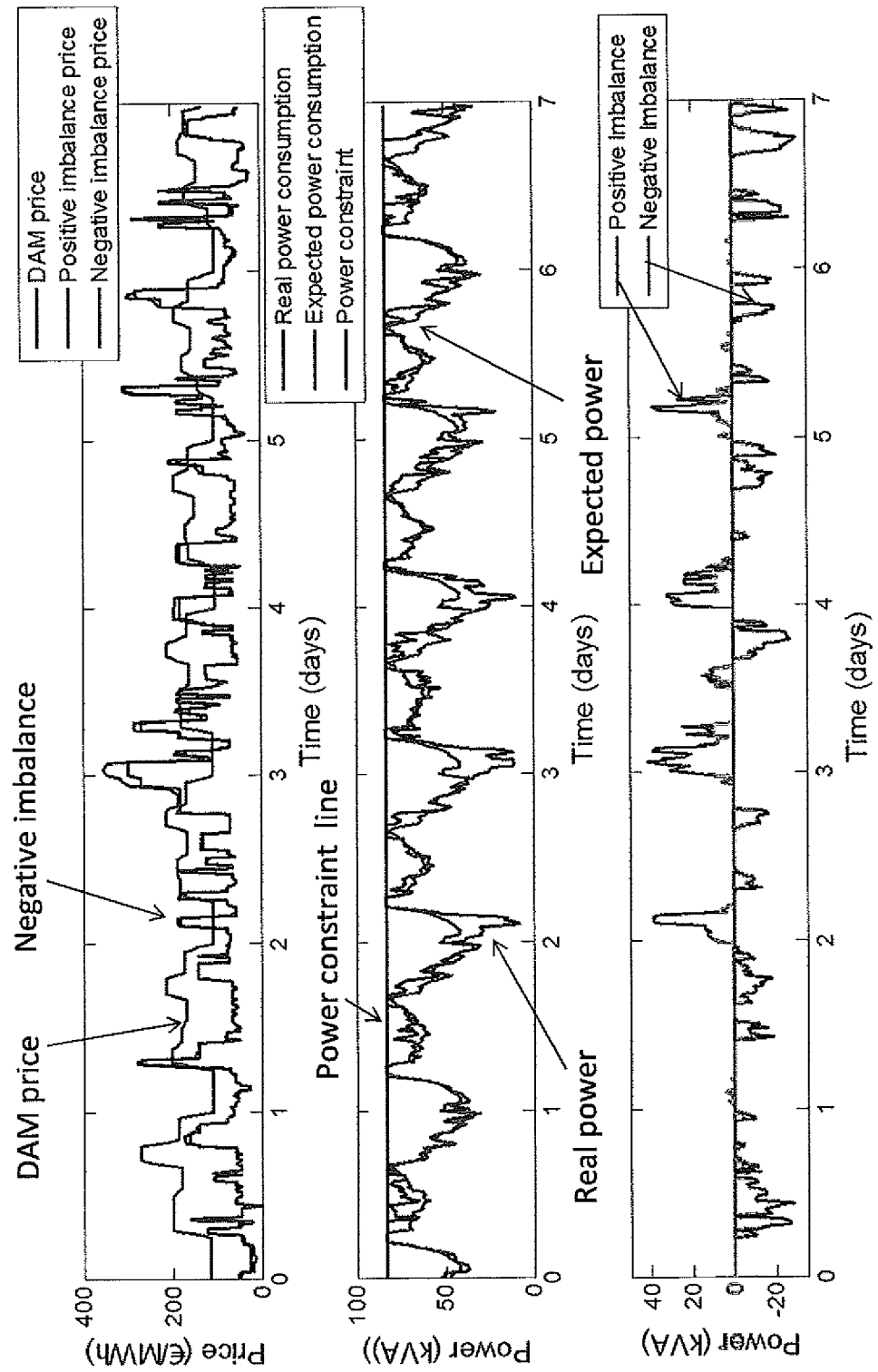
FIG. 8 shows positive and negative imbalance prices.

Recently, the price mechanism for imbalance costs in Belgium has changed. Now the Balance Responsible Party (BRP) must trade imbalance at their marginal costs. Imbalance price for February 2012 are used [16]. The values used in this simulation are shown in FIG. 8, together with the day-ahead price signal. As SLP used by the retailer, we used the daily averaged signal from the previous five days. First the average dump loads is subtracted and the system will optimize the heat pumps' schedule on the remaining. So the heat-pumps will follow the reserved power and the deviation caused by the dump loads. This does not necessarily mean that the imbalance is minimized. Four situations can be distinguished:

(i) Sometimes the system is in equilibrium and all purchased power is consumed;
(ii) if the positive imbalance price is bigger than the purchase price, the system will try to sell some redundant power.
(iii) At other moments, the system is still in a situation with too much power and the controller decides to sell this power, even if the positive imbalance price is smaller than the purchase price.
(iv) When the imbalance is negative, the system will reduce consumption, but this is not always sufficient to eliminate all imbalances. These negative imbalance has to be bought on the market. Note, however, that power is bought on the imbalance market at those moments when prices are low. Often, the imbalance prices are lower than the price on the day-ahead market.

The flexibility comes from the end-user, so one way or another, (s)he must be encouraged to use it for common purposes, like grid stability and/or predictability of the consumption. The imbalance needs to be further examined. We will build further on the constrained ToU scenario. First the imbalance is minimized. Next the profits/costs on the imbalance market are optimized.

As described above a method is proposed which merges the objectives of the different actors together and which can be implemented by adapting the system. The method is fast and distributed and can take common constraints into account. The main disadvantages are that the optimal solution is only found after some iterations and that each actor has to make predictions, which may contain some information that should still remain private.

Take for instance day-ahead markets. First of all, every actor has to give power production or consumption plannings in the form of bidding functions and a variable price allocation is used to schedule every actor. So no complete privacy exist either on a day-ahead market. Secondly, the quality of the prediction will probably be very different in both market structures. On a typical day-ahead market only large players are active, who can pretty well predict what amount of power they want to trade. Predictions made by individual households are much more spurious. Bad predictions on a day-ahead market must be balanced on the imbalance market, which is often not in the advantage of the trader. If this principle would be copied, no end-users would be willing to trade on such markets, since the imbalance costs become too high. From this point of view, it makes a better logic if the prediction unit is in hands of the coordination centre which manages the constraints. This would not be in conflict with privacy issues, since the prediction are based on historical data.

Thirdly, in principle gaming may not be allowed according to national rules. This is one of the reasons why much of the trading still has to be done manually. If software programs would be used directly, the source-code could indicate that the actor is actually applying game theory. In embodiments of the present invention it is assumes as well that the different actor are playing a cooperative game.

Fourthly, initially consumers and producers send bid function to the day ahead market without taking net constraints into account. The optimal match between both can be altered if the power grid cannot support the power transmission. This alternative match differs from the initial solution and is thus sub-optimal. In embodiments of the present invention, the Lagrange multipliers can also change the initial solution if net- or other constraints are violated.

A question avoided so far is how the cash flows go. Do the end-users have to pay the additional fee caused by the Lagrange multipliers? Or are the Lagrange multipliers (with dimension €/kWh) artificial variables without any financial consequences?

A first argument for financial consequences is that end-users have a real incentive to change their behavior, even to invest to become more flexible. A second is that the grid constraint is caused by the DSO, so he should be billed for grid constraints. An additional argument is that it is the DSO who sets the constraint. Take for instance a transformer. In the example solved earlier, a hard limit is used for the power, but short violation of this constraint can easily be tolerated without harming the transformer. Since the transformer is owned by the DSO, it is this actor who can decide the operation modes of the transformer. If the DSO would be the actor who is financially responsible for rescheduling, he can decide to tolerate constraint violations under certain conditions or to decide to invest in a larger transformer.

Similar argument can be used for profits and losses made on the imbalance market. In the end, the imbalance is caused by ill-predictions made by the retailer. So finally he should give the financial incentive. It is the end-users who have the flexibility to help the retailer lowering its costs or even to make additional profits. So somehow the end-user should receive an incentive for his/her efforts.

In summary, it is very well possible that the Lagrange multipliers are large and positive, which means that end-users are forced to consume less and to pay a larger virtual price for the power they actually consume, but from a business model point of view it makes more sense if the retailer and/or DSO would pay the end-user for lowering its consumption.

How can the incentive of end-users be measured? How can the flexibility of end-users be measured [see for example: Demand side integration: four potential business cases and an analysis of the 2020 situation. Fjo De Ridder, Maarten Hommelberg, Eefje Peeters, European transactions on electrical power, 2011.]? In the linear project for example, a virtual average consumption of smart devices has been proposed. Positive and negative deviations from this average behavior can be measured and be used as measure for flexibility. In the framework of this paper, we propose an alternative measure for flexibility: the flexibility of an end-user is its change in power consumption/production, due to a price change $$\text{Flexibility} = \frac{\partial p_{i,t}}{\partial \lambda_t} \cong \frac{p_{k+1,i,t} - p_{k,i,t}}{\lambda_{k+1,t} - \lambda_{k,t}} \qquad 4$$

In the iterative process, the Lagrange multipliers change continuously. The changes in 'prices' can be used, in a finite difference sense, as a perturbation in the price signal. Every end-user will react to this by possibly changing its power consumption/production. An end-user who does not react at all will have no flexibility. An end-user who is only willing to change its behavior if prices double, which is currently not the case, will also show no flexibility. In the economy, this measure is called the price-elasticity, which is commonly used.

In conclusion, no one looses. Retailers can postpone or avoid hard ware investments by giving sporadic incentives to end-users, retailers can lower imbalance costs or even make profits on the imbalance market by controlling end-users and these end-user receive financial incentives for their willingness to cooperate.

Summarising the above, a distributed optimal control method and system is proposed to coordinate end-users, a retailer, a BRP and a DSO. This scheme is exemplified on a district with an excess of heat pumps, so that coordination becomes critical for the stability of the distribution network.

First an overall utility function is decomposed, so that each player can optimize its own behavior. Lagrange multipliers guarantee that common constraints can be met.

In contrast with direct methods, less information needs to be shared with other members and each player can deal with its own local constraints. The main disadvantage is this type of distributed control algorithms is that every player must cooperate to meet common constraints.

The algorithm is tested on a district of 100 households of which 50 are equipped with a heat pump.

In a single tariff structure, the distribution network can cope with this. However, already in a double tariff structure, the network constraints are violated easily. This situation becomes worse is a Time-of-Use tariff structure is introduced. Network violations can be avoided if devices can collaborate, like is proposed in this paper.

Finally, the imbalance market is taken into account. It appears that the energy consumption deviates severely from the standard load profiles. These deviations are mainly driven by beneficial prices on the imbalance market.

References

[1] M. C. J. C. a. M. M. Warrington J, "Predictive power dispatch through negotiated locational pricing," *IEEE PES Innovative Smart Grid Technologies Europe, Gothenborg, Sweden*, October 2010.

[2] W. V. Xu J, "An approximate dynamic programming approach for coordinated charging control at vehicle-to-grid aggregator," *Smart Grid Communications, IEEE International Conference*, pp. 279-284, October 2011.

[3] W. V. J. J. S. R. L.-G. A. Mohsenian-Rad A, "Autonomous demand-side management based on game-theoretic energy consumption scheduling for the future smart grid," *IEEE Transactions on Smart Grids*, vol. 1, nr. 3, pp. 320-331, 2010.

[4] B. V. B. M. H. J. S. G. Molderink A, "Management and control of domestic smart grid technology," *IEEE Transactions on Smart Grids*, vol. 1, nr. 2, pp. 109-119, 2010.

[5] G. G. Gatsis N, "Residential load control: distributed scheduling and convergence with lost AMI messages," *IEEE Transactions on Smart Grids*, p. in press, 2012.

[6] C. I. O. J. Ruiz N, "A direct load control model for virtual power plant management," *IEEE Transactions on Power Systems*, vol. 24, nr. 2, pp. 959-966, 2009.

[7] B. A. P. W. S. W. Anderson A, "Adaptive stochastic control for the smart grid," *Proceedings of the IEEE ??????*, vol. 99, nr. 6, p. 1098, 2011.

[8] O. t. f. o. t. U. A. w. group, "Home area network system requirements specification," 2008.

[9] M.-R. A. S. R. W. V. J. J. Samadi P, "Optimal real-time pricing algorithm based on utility maximization for smart grid," *IEEE Internation Conference on Smart Grid Communications*, pp. 415-420, 2010.

[10] H. M. R. K. P. E. De Ridder F, "Demand side integration: exploring the flexibility of a cluster," *International journal of distributed energy resources*, vol, 5, nr. 4, pp. 295-314, 2009.

[11] D. R. F, H. M en P. E, "Demand side integration: four potential business cases and an analysis of the 2020 situation," *EUROPEAN TRANSACTIONS ON ELECTRICAL POWER*, vol. 21, nr. 6, pp. 1902-1913, 2011.

[12] W. C. K. I. K. S. G. hommelberg M, "Distributed control concepts using multi-agent technology and automatic markets: an indispensible feature of smart power grids," *IEEE Power engineering society general meeting*, pp. 1-7, 2007.

[13] "http://www.ecbcs.org/annexes/annex42.htm," [Online].

[14] F. H. a. W. J. E. Harlow, "Numerical calculation of time-dependent viscous incompressible flow of fluid with free surface," *Phys. Fluids.*, vol. 8, p. 2182, 1965.

[15] B. DP, Nonlinear Programming: 2nd Edition, Athena Scientific, 1999.

[16] "http://www.elia.be/en/grid-data/data-download," [Online].

Example 3: Local Power Clustering

In a smart grid, power will be produced locally, which should make energy transport less important. Many people believe that local consumption should be encouraged. Here a set of rules is shown, which stimulates local consumption over transportation of power:

End-users are encouraged to produce/consume their own power. If a local match is not possible, neighbors will be searched to consume/produce the local mismatch.

If a street is not able to balance its power production and consumption, it will connect to neighboring streets.

If neighboring streets cannot match, larger clusters will be formed to transport power from excess regions to shortage regions.

The principle is scalable and can be used on arbitrary larger clusters.

The aim of this simulation is to exemplify that algorithms can easily be deployed in a Lagrange context. In this embodiment multiple constraints can be merged together.

The main advantages are that transport losses are avoided or are at least in balance with the economical costs. A second advantage is that currents in transformers are avoided, which elongates the lifetime of these transformers.

DSO and TSO should gain the most from such algorithms.

Such algorithms can be implemented to isolate households, streets, districts, cities, regions, etc. . . . which can be beneficial to avoid black-outs or to reduce costs if feed-in tariffs would be introduced.

If feed-in tariffs are introduced at different levels (households to feeder, at the local transformer, at a substation, etc. . . . ), this algorithm allows to optimize local consumption/production under such feed-in tariff structures.

In this embodiment a multi-level optimization problem is reformulated as a constraint optimization problem, so that Lagrange multipliers can be used. By constraining these multipliers, the character of the minimization remains; i.e. the equality constraint does not have to be reached exactly.

This scheme allows the DSO to promote local production/consumption at different geographical scales.

Clusters can completely or partly be isolated with this control scheme.

Control Scheme

The global cost function is $$c(t) = \sum_k^{district} \sum_j^{street} \sum_i^{devices} p_{i,j,k} \lambda_{i,j,k} \quad (24)$$

Subject to:

$$\min \sum_i^{devices} p_{i,j,k} \quad \forall k, \forall j \quad (25)$$

$$\min \sum_j^{street} \sum_i^{devices} p_{i,j,k} \quad \forall k \quad (26)$$

$$\min \sum_k^{district} \sum_j^{street} \sum_i^{devices} p_{i,j,k} \quad (27)$$

The first constraint optimizes the local energy consumption.

The second optimizes the second-scale (street) consumption and the latter the consumption of each district.

This is in fact a multicriterion optimization, which can be difficult to solve.

For that reason, it is simplified to $$c(t) = \sum_k^{district} \sum_j^{street} \sum_i^{devices} p_{i,j,k} \lambda_{i,j,k} \quad (28)$$

Subject to:

$$\sum_i^{devices} p_{i,j,k} = 0 \quad \forall k, \forall j \quad (29)$$

$$\sum_j^{street} \sum_i^{devices} p_{i,j,k} = 0 \quad \forall k \quad (30)$$

$$\sum_k^{district} \sum_j^{street} \sum_i^{devices} p_{i,j,k} = 0 \quad (31)$$

Which is more stringent.

This can rewritten as (using Lagrange multipliers)

$$c(t) = \sum_k^{district} \sum_j^{street} \sum_i^{devices} p_{i,j,k} \lambda_{i,j,k} + \sum_k^{district} \sum_j^{street} \lambda_{k,j}^{street} \sum_i^{devices} p_{i,j,k} + \sum_k^{district} \lambda_k^{district} \sum_j^{street} \sum_i^{devices} p_{i,j,k} + \lambda^{city} \sum_k^{district} \sum_j^{street} \sum_i^{devices} p_{i,j,k} \quad (32)$$

With $$\lambda_{j,k}^{street,m+1} = \max\left[-\lambda_{max}^{street}, \min\left[\lambda_{max}^{street}, \lambda_{i,j,k}^{street,m} + \alpha\left(\sum_i^{devices} p_{i,j,k}\right)\right]\right] \quad (33)$$

$$\lambda_k^{district,m+1} = \max\left[-\lambda_{max}^{district}, \min\left[\lambda_{max}^{district}, \lambda_k^{district,m} + \alpha\left(\sum_j^{street} \sum_i^{devices} p_{i,j,k}\right)\right]\right] \quad (34)$$

$$\lambda^{city,m+1} = \max\left[-\lambda_{max}^{city}, \min\left[\lambda_{max}^{city}, \lambda^{city,m} + \alpha\left(\sum_k^{district} \sum_j^{street} \sum_i^{devices} p_{i,j,k}\right)\right]\right] \quad (35)$$

Where in is the iteration number. In each iteration the Lagrange multiplicators are updated in order to incorporate the constraints.

Note that the Lagrange multipliers are bounded. Under many conditions the equality constraints cannot be met and the corresponding Lagrange multipliers would become infinite. To avoid this, upper and lower limits are used. This corresponds in some sense to the minimization problem again.

The dual problem can easily be derived from the latter equation $$c_{i,j,k}(t) = p_{i,j,k}(\lambda_{i,j,k} + \lambda_{k,j}^{street} + \lambda_k^{district} + \lambda^{city}) \quad (36)$$

And solved locally.

If necessary, additional terms and constraints can be added, e.g.

$$c_{i,j,k}(t) = p_{i,j,k}(\lambda_{i,j,k} + \lambda_{k,j}^{street} + \lambda_k^{district} + \lambda^{city}) + \beta p_{i,j,k}^2 \quad (37)$$

Subject to $$p_{min} < p_{i,j,k} < p_{max} \quad (38)$$

Generalization

Examples

Figure 9:
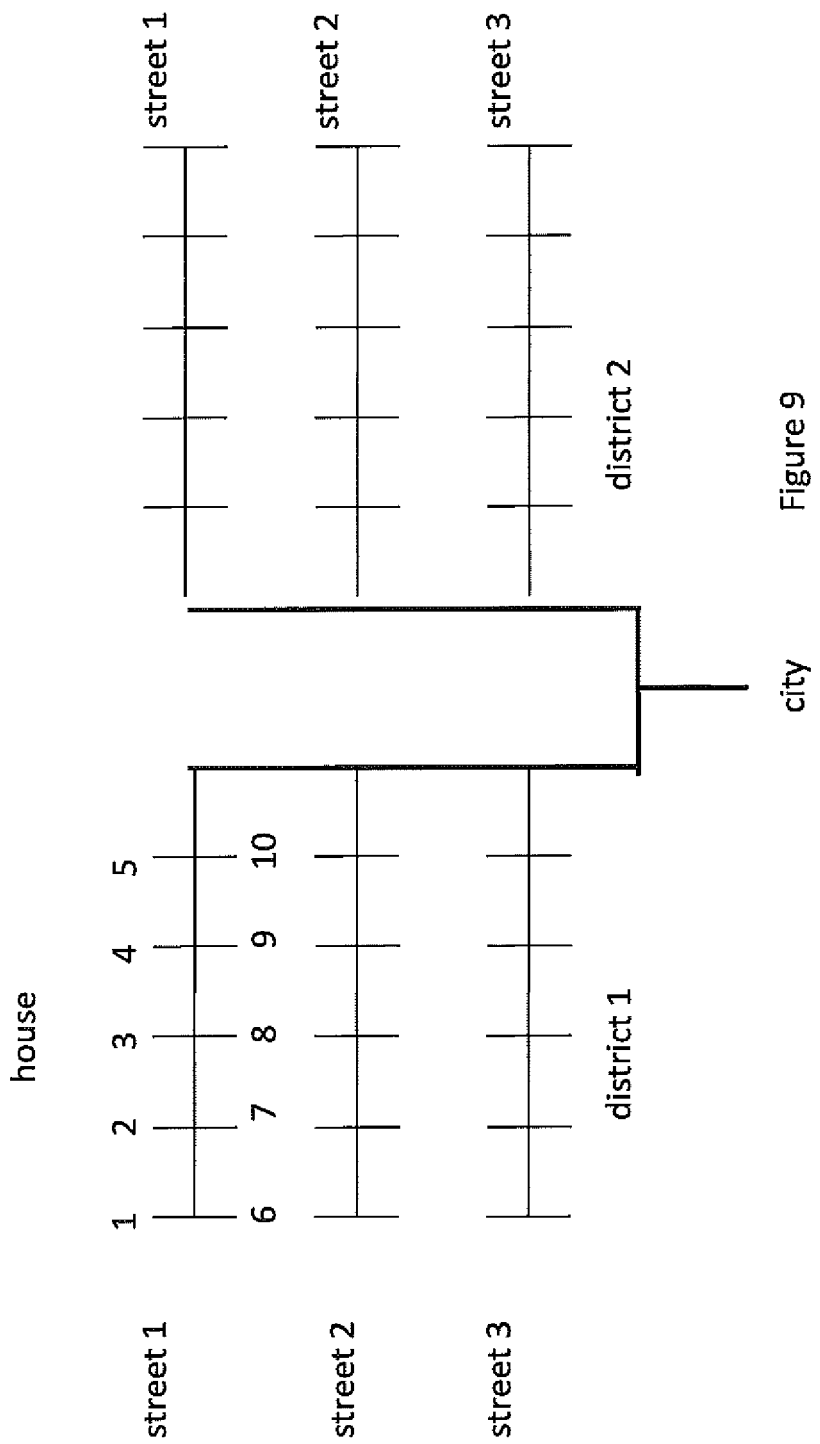
FIG. 9 shows a schematic representation of a city with two districts with each three streets with each 10 houses.

Consider for instance a city consisting of two districts. Each district consists of three streets and each street of 10 houses, as is shown in FIG. 9.

Figure 10:
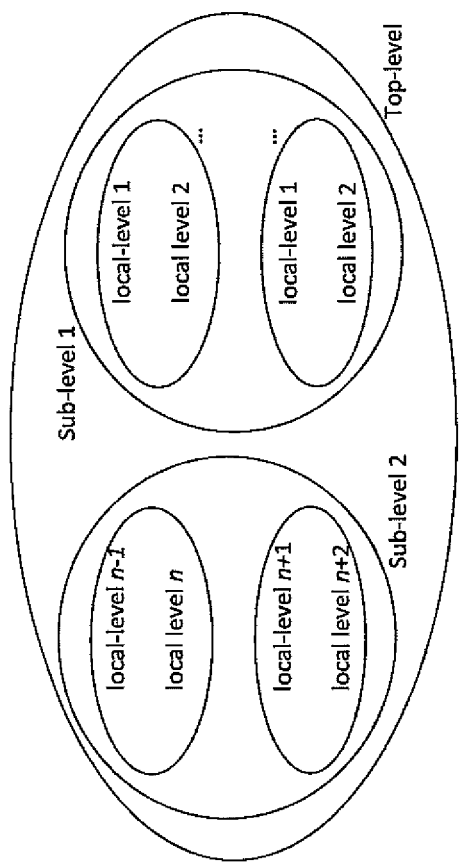
FIG. 10 shows a set-representation of the problem and solution.

An alternative visualization is given in FIG. 10. Every level balances its power by directing the local end-users. Note that the hierarchy of the levels depends on the limits of their Lagrange multipliers.

If these are not restricted, the influence can possibly become much larger.

Local Power Balancing

Here local consumption/production is encouraged. First every street tries to balance local consumption and production. If this is not possible, the streets within one district try to find a balance. Now every end-user is penalized for transporting its power over the local transformer. If the streets cannot find a balance, the two districts exchange power. Again every end-user is penalized for transporting its power over the substation. If both districts cannot find a balance, power is exchanged with a second city, etc. . . . .

Dynamical aspects are not yet taken into account. Every household simply consists of a dumb load, which is a sample from a standard normal distribution and a tunable load, which can vary between minus and plus one kW. A quadratic penalization is used to keep this tunable load unused if not necessary. So additional consumption of production by each end-user is proportional to the square of the demanded power.

Figure 11:
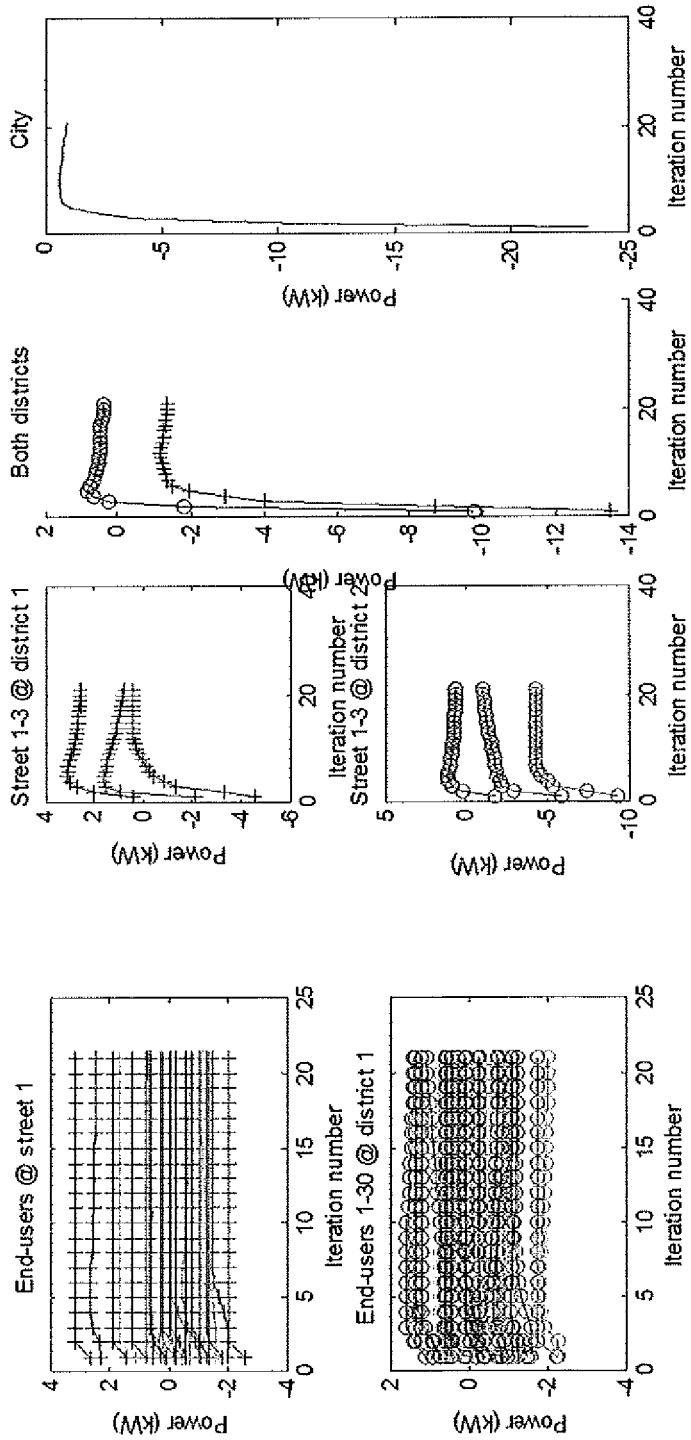
FIG. 11 shows a power at different cluster levels is. From left to right: at household level, at the street level, at the district level and the overall level.

FIG. 11 shows the power at the various levels in function of the iteration number. Initially, every household consumes its dumb load. When the Lagrange multipliers become active, the different houses in each street start to exchange power in order to lower costs at the transformer connected to that street. The same is happening at district level and at the city level.

Figure 12:
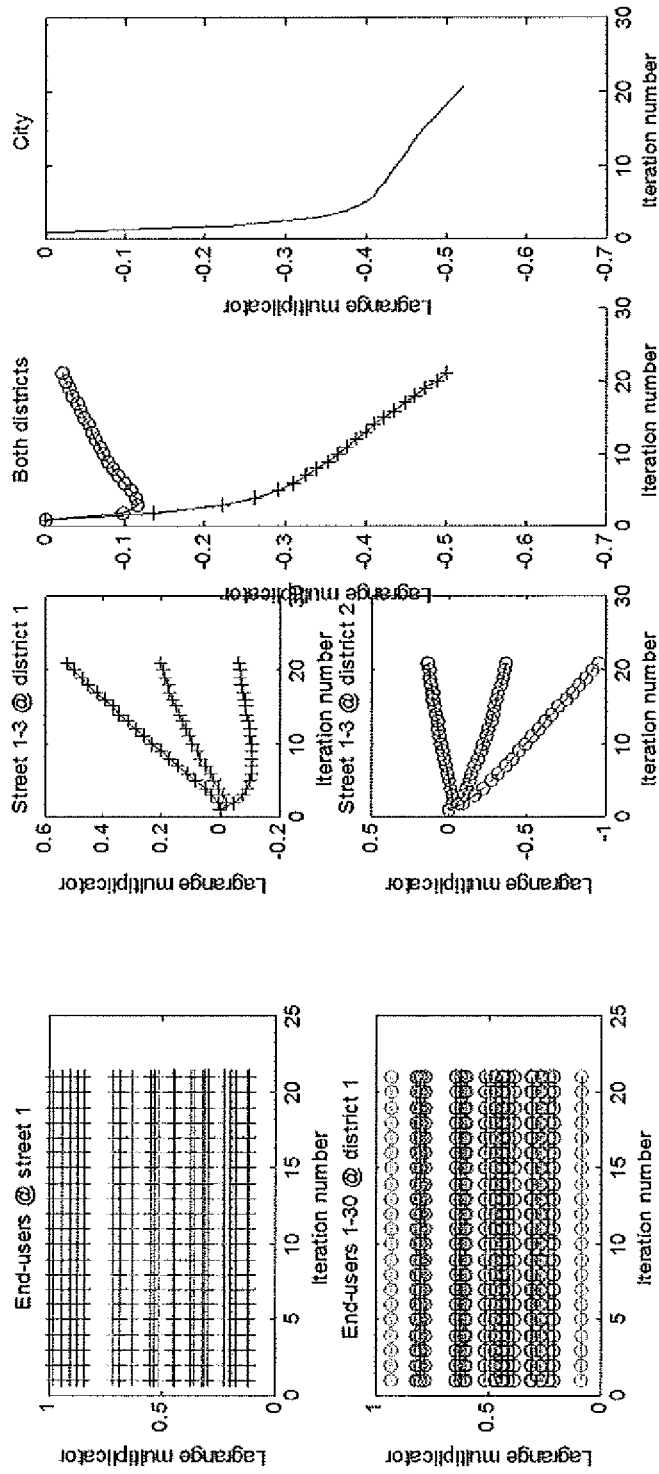
FIG. 12 shows Lagrange multipliers at different cluster levels. From left to right: at household level, at the street level, at the district level and the overall level.

Note that the total power balance is not zero. This can be explained: it is not a result of the limits on the Lagrange multiplicators, which did not hit those limits (see FIG. 12), but is a trade-off. If more controllable power is directed towards local balance, this would become more expensive than trading the imbalance on a higher level. For that reason, the algorithm decides to trade the remaining imbalance.

So although the numerical values are not yet realistic, one can see that transformers and feeders are less used and that power transport is minimized, Clustering and Islanding to Prevent Black-Outs In this second example, we illustrate that the survival time of a cluster increases rapidly with the size of the cluster.

Background: suppose that a region has a lot of flexible power and/or local production. Under these conditions it can easily be switched off from the main grid for a while. This can prevent black-outs in the main grid. Suppose for example that a power shortage occurs. If several regions can be isolated and can survive this, the remaining of the main grid can more easily survive the power shortage. Of course, this islanding will drastically change the behavior inside the islanded region since it is now in a starvation mode.

Every 15 minutes, we check which houses are still operational. In a first test, every household has to balance its own power. Secondly, the same has to be done for each street and finally every district has to find a balance.

Figure 13:
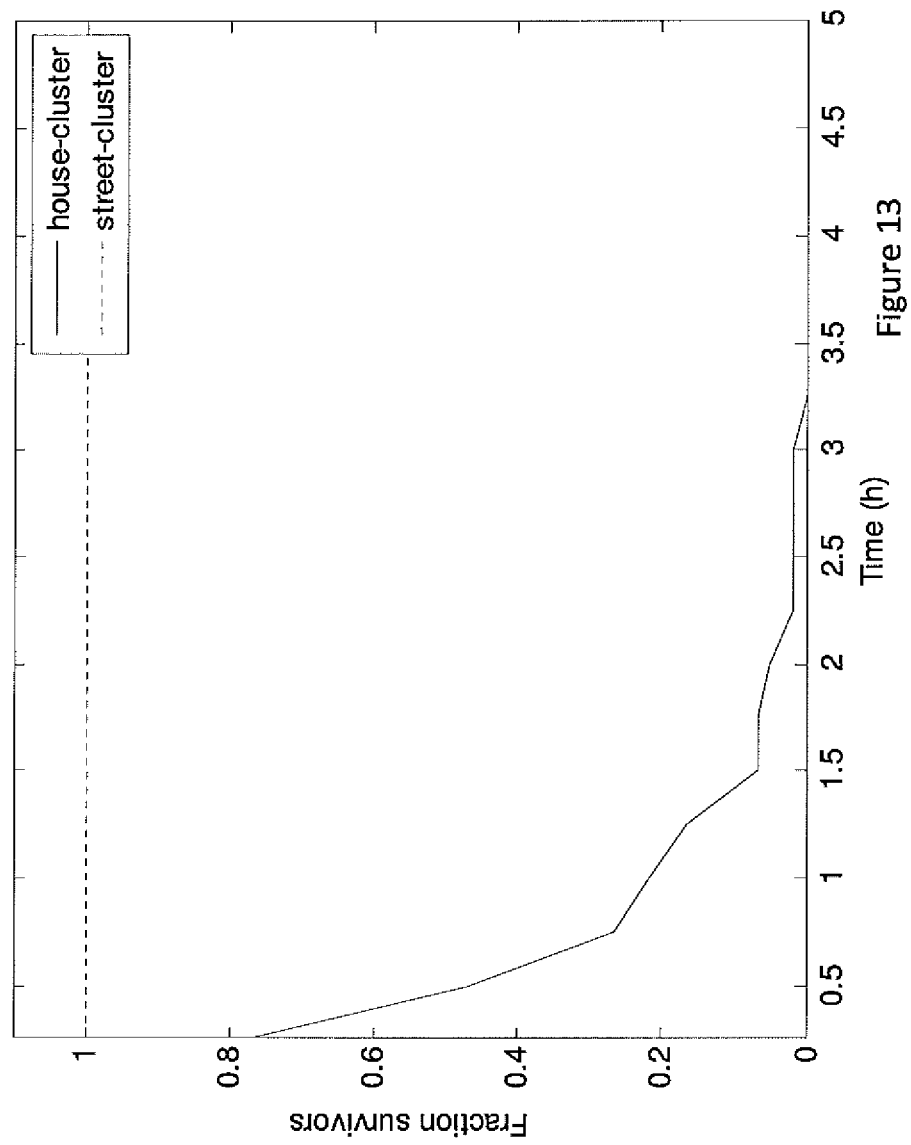
FIG. 13 shows a comparison between survival time in case of a black-out between individual end-users and a cluster of ten (street). The controllable load is limited to 1 kW.

FIG. 13 shows the fraction of houses and streets that are surviving if the controllable load is limit by 1 kW. 100% of the streets survive the test, while the last house survives for 3 h.

Figure 14:
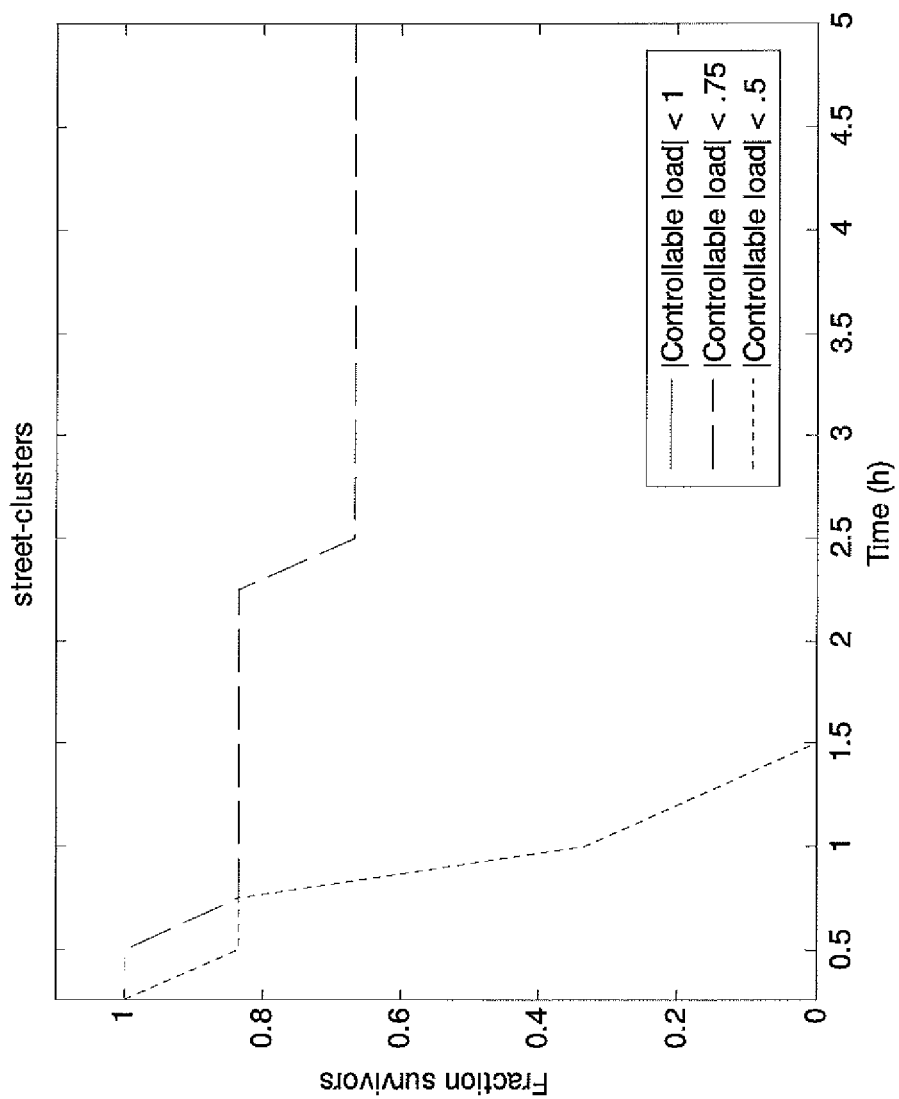
FIG. 14 shows a comparison between the survival times of different streets with different levels of controllable loads. The uncontrollable loads are sampled from a standard normal distribution, the controllable loads vary between 0.5 and 1 kW.

If the controllable load is lowered from 1 kW to 0.75 kW, also street-clusters may not survive. If the controllable load is lowered to 0.5 kW even the last of the 6 streets survives for 1.5 h only as can be seen in FIG. 14.

Figure 15:
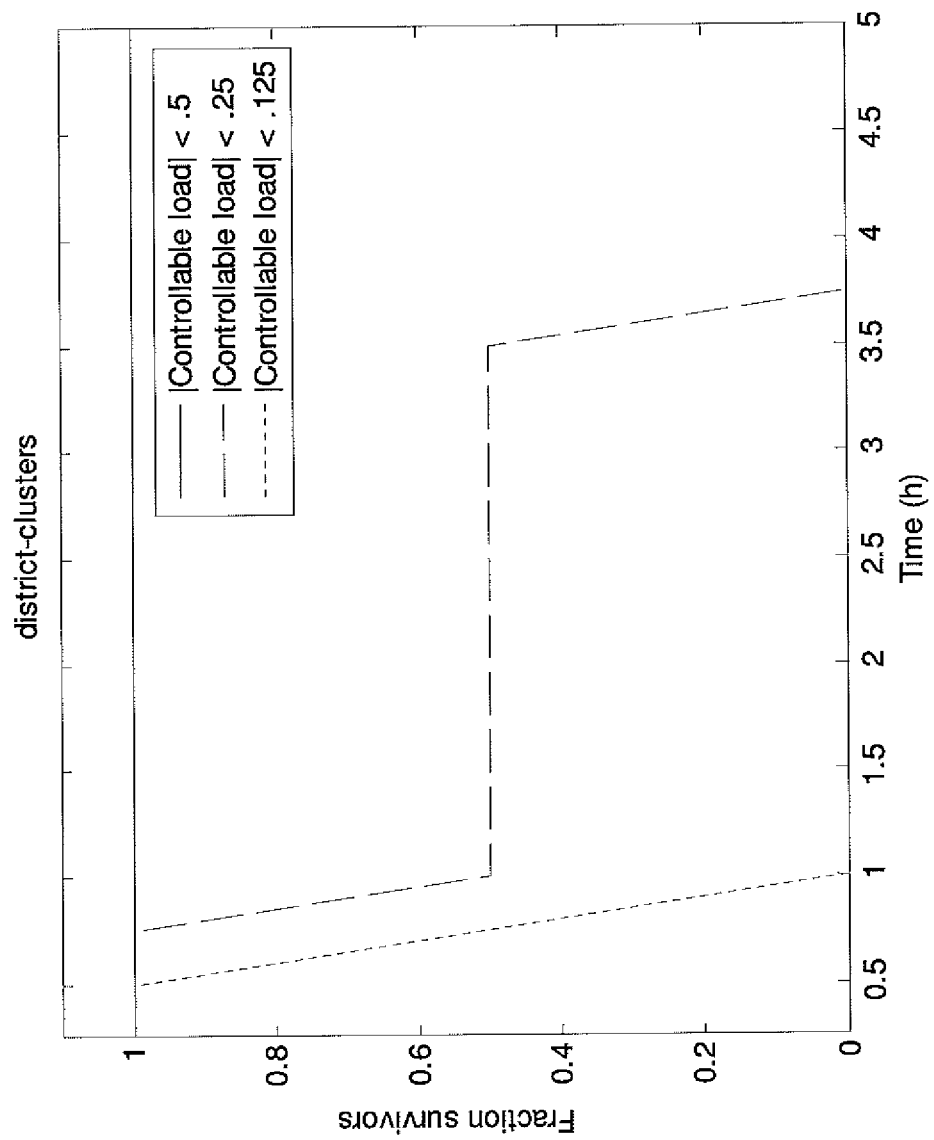
FIG. 15 shows a comparison between the survival times of districts with different levels of controllable loads. The uncontrollable loads are sampled from a standard normal distribution, the controllable loads vary between 0.125 and 0.5 kW.

Districts survive this test, even when the controllable load is only 0.5 kW (see FIG. 15).

Note that, although the data are not yet realistic, the survival time increases rapidly when the number of house increases.

This opens the possibility to put certain cluster for a couple of hours in an islanding mode. For the cluster, this does not matter, since it can survive islanding, but for the BRP, this can ensure power supply to more critical regions, like harbors, industry, hospitals, etc. . . . .

Example 4: Controlling Reactive Power

The DSO is responsible to keep the reactive power small, i.e. the phase difference between voltage and current must usually be smaller than 0.3 radials (cos phi>0.95).

Industrial installation are often responsible themselves not to produce too much reactive power.

Households have currently no limits on the amount of reactive power that may be produced, but the implementation of e.g. heat pumps may cause problems on the distribution grid. The engine of a heat pump has typically a cos phi of about 0.8. So if in a district a lot of heat pumps are working simultaneously the reactive power produced in this district may become large.

This may harm for instance the transformer, because much larger current are needed to support the same power.

Converters, currently used to connect photovoltaic installation to the grid or to modulate the power consumed by a heat pump can be used to inject reactive power to the grid. If this is done in an intelligent way, it can cancel the reactive power produced by other devices or other end-users without (almost) any additional costs.

Other applications are for example: if a district is a power producer and the redundant power has to be transported over a long feeder, the cos phi can be tuned in this district so that it becomes zero at the other side of the transport cable (usually transport cable has an inductive character).

Formulation

We start from the heat pump example explained in the example "Coordination method for heat pumps on a district level", where the overall optimization problem is given by $$\min_{\substack{E^a_{i,t}, E^b_{i,t}, \\ p^{th,a}_{i,t}, p^{th,b}_{i,t}, p^{el}_{i,t}, p^{el}_t, \\ \Delta^+_{p_t}, \Delta^-_{p_t}}} \sum_{t=0}^{M} \sum_{i=1}^{N} f_i(p^{el}_{i,t}) + h(p^{el}_t) + g(\Delta^+_{p_t}, \Delta^-_{p_t}) \qquad 5$$

Subject to:

Equations (1-5) in the other $\forall t, \forall i$ document $$0 \le \Delta p^+_t \le \overline{p} \qquad \forall t \qquad 40$$

$$-\overline{p} \le \Delta p^-_t \le 0 \qquad \forall t$$

$$0 \le p^{el}_t \le \overline{p} \qquad \forall t$$

$$\sum_{i=1}^{N} p^{el}_{i,t} \le \overline{p} \qquad \forall t$$

$$\Delta p^+_t + \Delta p^-_t = \sum_{i=1}^{N} p^{el}_{i,t} - p^{el}_t \qquad \forall t$$

With the local end-users optimization problem formulated as $$\min_{\substack{E^a_{i,t}, E^b_{i,t}, \\ p^{th,a}_{i,t}, p^{th,b}_{i,t}, p^{el}_{i,t}}} \sum_{t=0}^{M} f_i(p^{el}_{i,t}) - (\gamma^a_t + \gamma^b_t) p^{el}_{i,t} T_s \qquad 41$$

Subject to $$f_i(p_{i,t}^{el}) = \lambda_t p_{i,t}^{el} + \varepsilon (p_{i,t}^{el})^2 T_s \quad (6)$$

$$\Delta T_{i,t-1/2}^a = (p_{i,t}^{th,a} T_s - H_{i,t}^a)/(c_w V^a)$$

$$\Delta T_{i,t-1/2}^b = (p_{i,t}^{th,b} T_s - H_{i,t}^b)/(c_w V^b)$$

$$CoP \cdot p_{i,t}^{el} = p_{i,t}^{th,a} + p_{i,t}^{th,b}$$

$$\underline{T}^a \leq T_{i,t-1/2}^a \leq \overline{T}^a$$

$$\underline{T}^b \leq T_{i,t-1/2}^b \leq \overline{T}^b$$

$$\underline{T}^b = 22° C. - 0.43(T_{exterior} - 20° C.)$$

$$\overline{T}^b = \underline{T}^b + 10° C.$$

$$0 \leq p_{i,t}^{el} \leq \overline{p}_i \quad (*)$$

Here reactive power is not taken into account and $p_{i,t}^{el}$ is the active power consumed by the heat pump.

If in this district the reactive power must vanish, this can be achieved by adding an additional constraint to the overall system, i.e.

$$\sum_{i=1}^{N} q_{i,t}^{el} + q_{i,t}^{dumb} = 0 \quad \forall t \quad (43)$$

Where $q_{i,t}^{dumb}$ is the reactive power produced by uncontrollable loads.

Equation (*) must be replaced by $$0 \leq |p_{i,t}^{el} + q_{i,t}^{el}| \leq \overline{p}_i \quad (44)$$

In addition the reactive power is constraint by $$|q_{i,t}^{el}| \leq \overline{q} \forall t, \forall i \quad (45)$$

This additional constraint can be incorporated using the Lagrange multiplicator technique and the dual problem becomes $$\min_{\substack{E_{i,t}^a, E_{i,t}^b, \\ p_{i,t}^{th,a}, p_{i,t}^{th,b}, \\ p_{i,t}^{el}, q_{i,t}^{el}}} \sum_{t=0}^{M} f_i(p_{i,t}^{el}) - (\gamma_t^a + \gamma_t^b) p_{i,t}^{el} T_s + \gamma_t^c q_{i,t}^{el} T_s \quad (7)$$

Subject to Equations (42), (45) and (45).

Example

To illustrate this algorithm, we use the simulation which was set up in the example "Coordination method for heat pumps on a district level", i.e. a district of 100 houses is used with a transformer of 240 kVA and three phases. Each house consumes an uncontrollable dumb load with a cos phi of 0.95. This load is based on real data measured in Flanders, Belgium.

Only one phase is considered and interactions between the phases are ignored. So 34 houses are considered in this simulation and the transformer capacity is about 80 kVA. Half of the houses are equipped with a heat pump, which has a default cos phi of 0.8. Half of these heat pumps can adapt their reactive power. So overall 8 houses of the 34 can tune their reactive power.

Figure 16:
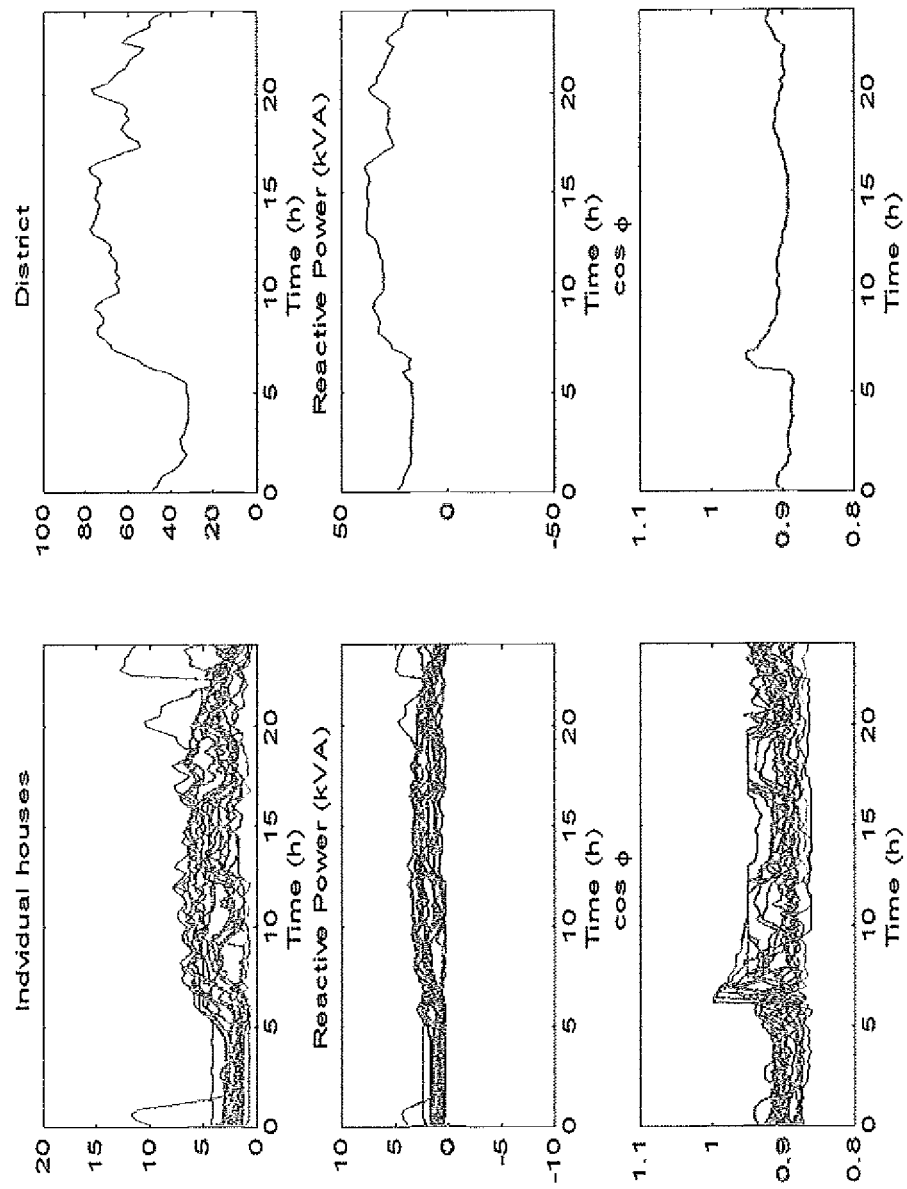
FIG. 16 shows active and reactive power and cos phi if the reactive power is not altered; all other constraints having been taken into account.
Figure 17:
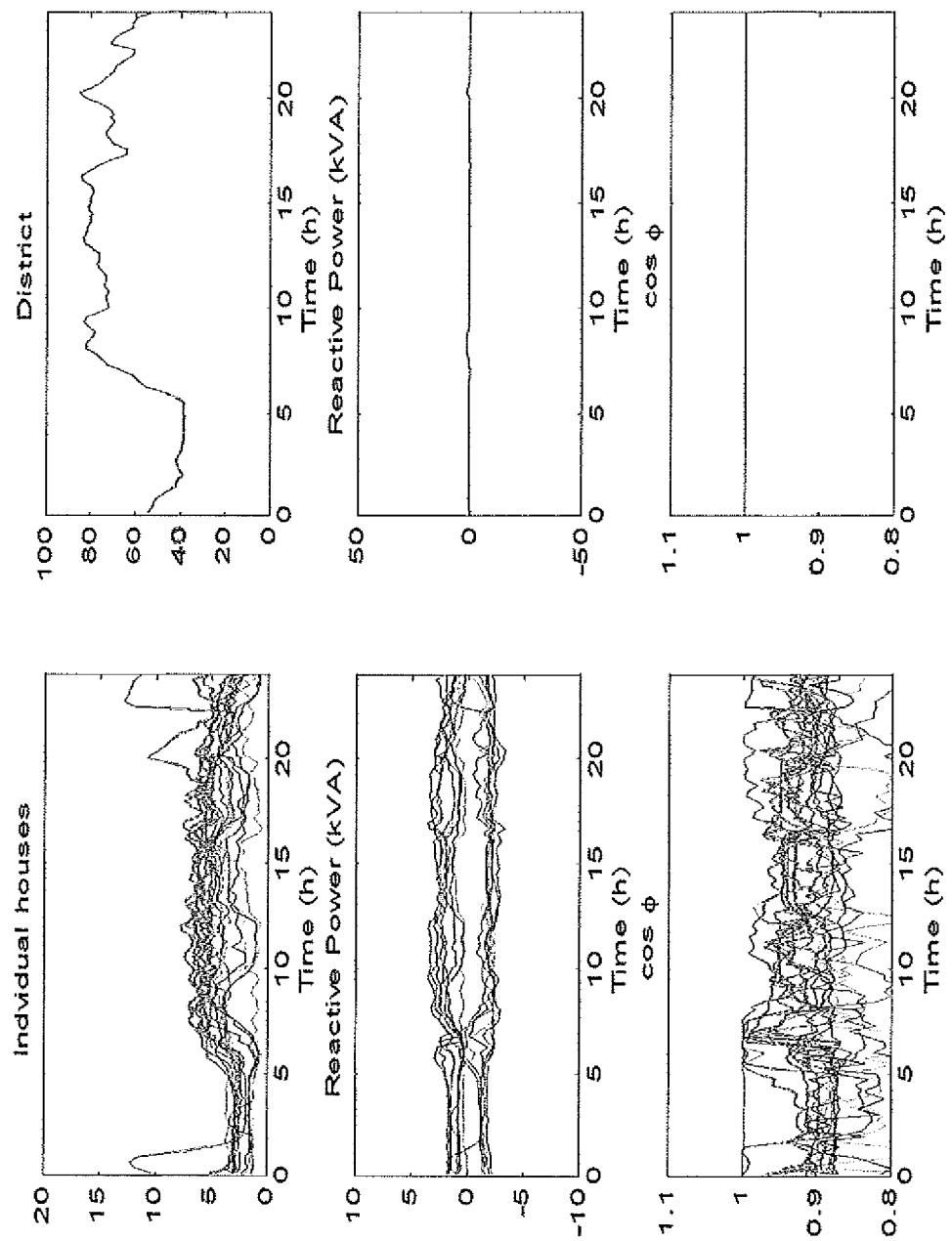
FIG. 17 shows half of the heat pumps tuned their reactive power so that the overall cos phi is equal to one.

FIG. 16 shows the results if no heat pump reacts to reactive power. FIG. 17 shows the results if half of the heat pumps tune their convertor to reduce reactive power.

Example 5: Electrical Cars

Figure 18:
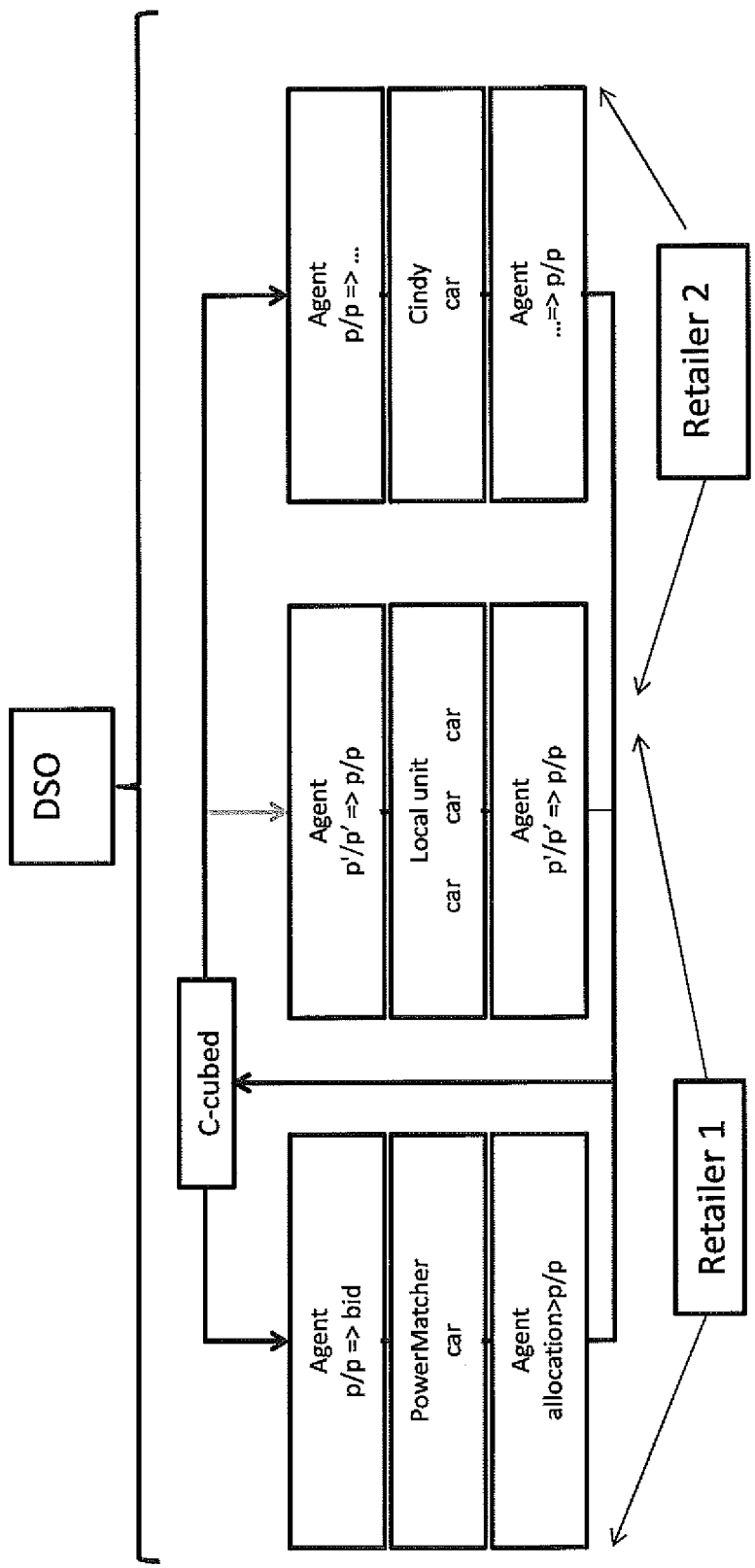
FIG. 18 shows a schematic representation of a simulation.

Results are presented of a simulation to illustrate that the proposed solution can be constructed. The scheme relates to 5 electric or hybrid cars parked in a street and fed with a feeder with limited capacity. If all the cars take maximum charging power for their batteries, the feeder current rating will be exceeded. Hence, the cars need to cooperate in order to remain below the constraint of the feeder. One car uses the PowerMatcher, three cars use a moving horizon MPC algorithm and one car does not use any communication device. Two different retailers are active. The first delivers power to the PM-car and two of the three MH cars. The second delivers power to the last MH car and to the non-communicative car, as can be seen in FIG. 18.

The translation agents for the PowerMatcher and three Moving Horizon controllers function as described above and the translation agent for the non-communicative controller does not do anything. The scheduler agent for the Power-Matcher and the non-communicative agent makes schedules based on historical data (i.e. the mean over the last day is used). For the Moving Horizon controllers, the schedules made by the algorithm are used directly.

Figure 19:
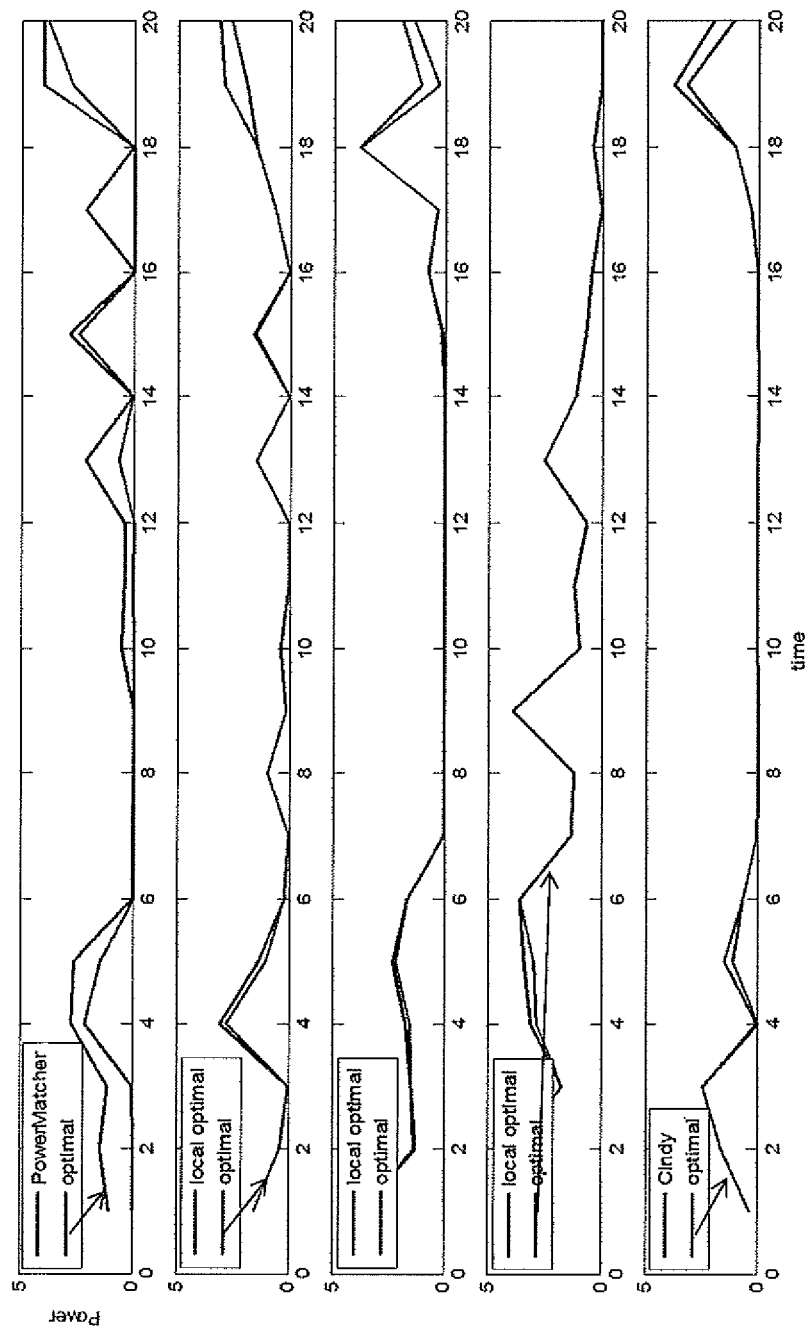
FIG. 19 shows charging power for 5 cars. Control algorithms from top to bottom: PM, MPC, MPC, MPC, none.

A simulation is shown in FIG. 19.

Arbitrary and thus unrealistic values were chosen for the parameters, like the charging power, the power consumed when a car is driving, etc. . . . only the capacity of the feeder is chosen so that not all cars can always load simultaneously. In FIG. 18, black the charging power is shown for each control unit. In red the optimal values are shown. These would have been reached when every car were using the MPC algorithm, which is optimal. Since the Cindy car and PM car use different controllers, their charging pattern differs. For the three MPC controllers both patterns differ also slightly, but this is due to the constraints.

Implementation

As explained above the present invention relates to methods, systems and components for controlling a supply network. Both production and consumption equipment is involved. However software and computer programs can provide useful implementation options. The present invention therefore includes a computer program product in the form of software having code segments, which when executed on a processing device such as a microprocessor, microcontroller, Field Programmable Gate Array, etc. can be used in a method for controlling an energy or power supply network comprising a coordination centre, a plurality of local end-user units and a communications network linking the local units and the coordination centre and a supply network connecting the local units and the coordination centre for energy or power supply, the supply network having one constraint that limits power or energy consumption at at least one of the local end-user units.

The software can be adapted to allow the coordination centre to transmit a steering control signal indicating a degree of imbalance of the system to the at least one of the local end-user units. The software may also be adapted to allow the at least one local end-user unit transmitting a reaction signal to the coordination centre indicative of a power schedule for the local unit.

When there is a local controller at a local end-user unit, the software may also be adapted to allow translating control and/or reaction signals to be understandable for the local controller. The software may also be adapted to allow comparing the reaction signal with a reaction signal derived from historical data to determine an error or to determine fraudulent behavior. The software may also be adapted to allow a power schedule includes a prediction of a future consumption. In any of the software the control signal can be derived from a voltage, current and/or frequency signal.

The voltage signal can be the frequency, current or voltage of the energy or power supply network, whereby the software may also be adapted such that lowering or raising of the voltage, current or frequency about a standard value is an indication of the degree of instable operation of the power supply system.

Following communication failure between a coordination centre and at least one end-user unit, the software may also be adapted to allow the local end-user unit to continue to control local power consumption using the last known control signal.

The software may also be adapted to allow the coordination center to continue coordinating other end-users, taking only the out-dated schedules from the disconnected unit or units into account.

In any of the software, the control signal can be a Lagrange multiplier and the control signal can represent a measure of whether power or energy used is too high or too low.

The software may also be adapted to allow controlling of the energy or power supply network, by any of:
controlling the reactive power in the network;
controlling the power flows in the network, so that operation of network components remains stable;
keeping the network operating within network constraints, for example keeping the voltage, current or frequency at every point in the network within predefined limits;
controlling harmonics,
balancing power so that produced and consumed power is equal.

In any of the software the control or the reaction signal can have a scalar value.

The power consumption or production can be characterized by any of power, reactive power or harmonics and for each of these quantities the software may also be adapted to allow a different set of imbalance parameters to be used, The software may also be adapted to allow controlling the energy or power supply network to include the step of decomposing the control into sub-problems which each can be solved locally in local controllers or centrally in a co-ordination centre via an iterative process.

Any of the software can allow the control signal can be updated according to the reaction signal. In particular the control signal can be any of
A penalty function or value as function of consumed power,
A penalty without horizon,
A multiple of control signals selected from voltage, current, phase difference between voltage and current or harmonics.

The software may also be adapted to allow the reaction signal to be an aggregate of schedules from different local end users.

The software may also be adapted to allow the reaction signal to comprise or consist of two parts, a first part related to the instant power consumption/prediction, and a second, prediction part.

The software may also be adapted to allow controlling the energy or power supply network such that
the one constraint is met
the control signal is steady, and
the reaction signals are steady.

The software may also be adapted to allow the reaction signal to be obtained by monitoring whether the one constraint is met or violated.

The local unit can have local intelligence and digital processing power and the software may also be adapted to allow running a solver which solves a power use optimization problem of the local unit taking into account the received control signal.

The software may also be adapted so that depending on the value of the control signal, a power schedules are sent to the coordination centre from the local unit.

The coordination centre can receive the schedule and the software may also be adapted to allow update the control signal and resend the updated control signal to the local unit, in an iterative manner until the one constraint is met.

The invention claimed is:

1. A method for controlling an energy or power supply network using an energy or power control system, said energy or power control system comprising a coordination center, a plurality of local end-user units and a communications network linking the local units and the coordination center and a supply network connecting the local units and the coordination center for energy or power supply, the supply network having at least one or more constraints that limits power or energy consumption at at least one of the local end-user units, wherein at least some of the local end-user units have a local controller, the method comprising:
the coordination center transmitting a steering control signal indicating a degree of deviation of energy or power supply to the energy or power supply network to the at least one of the local end-user units, and the at least one local end-user unit transmitting a reaction signal to the coordination center indicative of a power schedule for the local unit,
wherein controlling the energy or power supply network comprises decomposing control of the system into sub-problems which each is solved locally in the local controllers via an iterative process,
wherein the local controller provides the reaction signal to the coordination center and receives the steering control signal in return from the coordination center,
wherein the local unit has local intelligence and digital processing power and runs a solver which solves a power use optimization problem of the local unit taking into account the received steering control signal,
wherein the coordination centre receives the reaction signal indicative of the power schedule for the local unit and updates the control signal and resends the updated control signal to the local unit in an iterative manner until the at least one or more constraints are met.

2. The method of claim 1 wherein the control signal is selected from:
a control signal derived from a technical constraint setting, selected from voltage, frequency, current, temperature, pressure, chemical composition or other variables describing a state of the energy or power supply network;
a control signal selected from control signals exchanged in column generation, wherein the control signals are sent from the plurality of local end-user units and represent a measure of whether power or energy used is too high or too low;

a control signal having a penalty function or value as a function of power consumed by the energy or power supply network;

a control signal selected as a function of a penalty without horizon; and a multiple of control signals selected from voltage, current, phase difference between voltage and current or harmonics.

3. The method of claim 1 wherein the control signal has a scalar value or the control signal is updated according to the reaction signal.

4. The method of claim 1, wherein the control signal has a value and depending on the value of the control signal, power schedules are sent to the coordination center from the local unit.

5. The method of claim 2, wherein the voltage signal is a frequency or a voltage of the energy or power supply network, whereby lowering or raising of the voltage or frequency about a set value being an indication of a degree of off-stable operation of the energy or power supply network.

6. The method of claim 1, wherein controlling the energy or power supply network, comprises any of:

Controlling reactive power in the energy or power supply network;

controlling power flows in the energy or power supply network by optimizing said power flows, so that operation of the energy or power control system components remains stable;

keeping the energy or power supply network operating within network constraints by keeping the voltage, current or frequency at every point in the energy or power supply network within predefined limits;

controlling harmonics of power supply to and used by the system; and balancing power so that produced and consumed power is equal by optimizing power used by the energy or power supply network.

7. The method of claim 1 wherein controlling the energy or power supply network is by:

keeping the network operating within a set of network constraints, so that the control signal and the reaction signals are steady.

8. The method of claim 1, wherein the reaction signal is selected from one of:

a scalar value, and an aggregate of power schedules from different local end users.

9. The method of claim 1, wherein the reaction signal comprises two parts, a first part related to an instant power consumption/prediction, and a second prediction part which is a best estimate of the power consumption, or wherein the reaction signal is obtained by monitoring whether one or more constraints on the energy or power supply network are met or violated.

10. The method according to claim 1, further comprising translating control and/or reaction signals for the local controller.

11. The method of claim 1 further comprising: comparing the reaction signal with consumed or produced power derived from historical data to determine an error or to determine fraudulent behavior or other deviations.

12. The method according to claim 1 wherein a power schedule includes a prediction of a future consumption.

13. The method of claim 1 wherein power consumption or production by the energy or power supply network is characterized by any of power, reactive power or harmonics and for each of these quantities a different set of imbalance parameters is used to control the power consumption or production.

14. A non-transitory signal storage device storing a computer program product comprising code segments which when executed on a processing device implement the method of claim 1.

15. The method of claim 1, wherein the steering control signal is at least used to alter an amount of electric energy or power supply that is used by the local end-user units.

16. The method of claim 1, wherein when a communication over the communication network fails between the coordination center and at least one end-user unit such that said at least one end-user unit becomes disconnected from the coordination center, the local end-user unit continues to control local power consumption using the last steering control signal that was received from the coordination center before the end-user unit became disconnected from the coordination center, and the coordination center continues coordinating other end-users, taking only previously received schedules from the end-user unit that is, or end-user units that are, disconnected from the coordination center into account for determining and transmitting the steering control signal.

17. The method of claim 1, wherein the control signal is a control signal determined using a Lagrange multiplier of the energy or power supplied to the energy or power supply network.

18. A system for controlling an energy or power supply network comprising a coordination center, a plurality of local end-user units and a communications network linking the local units and the coordination center and an energy or power supply network connecting the local units and the coordination center for energy or power supply, the energy or power supply network having one or more constraints that limits power or energy consumption at at least one of the local end-user units, the system being adapted so that the coordination center transmits a control signal indicating a degree of imbalance of the system to the at least one of the local end-user units, and the at least one local end-user unit is adapted to transmit a reaction signal to the coordination center indicative of a power schedule for the local unit, wherein the imbalance is a degree of deviation of energy or power supply to the system to the at least one of the local end-user units, wherein the system is adapted to control the energy or power supply network by decomposing the controlling into sub-problems which each are solved locally in local controllers via an iterative process, wherein the local unit has local intelligence and digital processing power and runs a solver which solves a power use optimization problem of the local unit taking into account the received control signal, wherein the coordination centre is adapted for receiving the schedule, updating the control signal, and resending the updated control signal to the local unit in an iterative manner until the at least one or more constraints are met.

19. A coordination center for use with a system for controlling an energy or power supply network comprising the coordination center, a plurality of local end-user units and a communications network linking the local units and the coordination center and an energy or power supply network connecting the local units and the coordination center for energy or power supply, the energy or power supply network having one or more constraints that limits power or energy consumption at at least one of the local end-user units, the coordination center being adapted to transmit a control signal indicating a degree of deviation of energy or power supply to the system to the at least one of the local end-user units, and to receive from the at least one local end-user unit a reaction signal indicative of a power schedule for the local unit,
- wherein the system is adapted to control the energy or power supply network by decomposing the controlling into sub-problems which each are solved locally in local controllers via an iterative process,
- wherein the local unit has local intelligence and digital processing power and runs a solver which solves a power use optimization problem of the local unit taking into account the received control signal,
- wherein depending on the value of the control signal, a power schedule is sent to the coordination centre from the local end-user unit,
- wherein the coordination centre is adapted for receiving the schedule, updating the control signal, and resending the updated control signal to the local unit in an iterative manner until the at least one or more constraints are met.

20. A local user unit for use with a system for controlling an energy or power supply network comprising a coordination center, a plurality of local end-user units and a communications network linking the local units and the coordination center and an energy or power supply network connecting the local units and the coordination center for energy or power supply, the energy or power supply network having one or more constraints that limits power or energy consumption at at least one of the local end-user units, the at least one local user unit being adapted to receive a control signal indicating a degree of imbalance of energy or power supply to the system from the coordination center, and the at least one local end-user unit being adapted to transmit a reaction signal to the coordination center indicative of a power schedule for the local unit,
- wherein the system is adapted to control the energy or power supply network by decomposing the controlling into sub-problems which each are solved locally in local controllers via an iterative process,
- wherein the local unit has local intelligence and digital processing power and runs a solver which solves a power use optimization problem of the local unit taking into account the received control signal,
- wherein depending on the value of the control signal, a power schedule is sent to the coordination centre from the local end-user unit,
- wherein the coordination centre is adapted for receiving the schedule, updating the control signal, and resending the updated control signal to the local unit in an iterative manner until the at least one or more constraints are met.

* * * * *